US011601458B2

(12) United States Patent
Jain et al.

(10) Patent No.: US 11,601,458 B2
(45) Date of Patent: Mar. 7, 2023

(54) METHODS AND SYSTEMS THAT GENERATE AND USE MICROSEGMENTATION QUOTIENTS FOR SECURITY MONITORING OF DISTRIBUTED-COMPUTER-SYSTEM COMPONENTS

(71) Applicant: VMware, Inc., Palo Alto, CA (US)

(72) Inventors: Jayant Jain, Palo Alto, CA (US);
Anirban Sengupta, Saratoga, CA (US);
Rick Lund, Palo Alto, CA (US);
Kausum Kumar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 256 days.

(21) Appl. No.: 17/062,600

(22) Filed: Oct. 4, 2020

(65) Prior Publication Data
US 2022/0109684 A1  Apr. 7, 2022

(51) Int. Cl.
*H04L 29/06* (2006.01)
*H04L 9/40* (2022.01)
*G06K 9/62* (2022.01)

(52) U.S. Cl.
CPC ........ *H04L 63/1425* (2013.01); *G06K 9/6256* (2013.01); *H04L 63/1433* (2013.01); *H04L 63/168* (2013.01); *H04L 63/20* (2013.01)

(58) Field of Classification Search
CPC ............. H04L 63/1425; H04L 63/1433; H04L 63/168; H04L 63/20; H04L 63/0209; H04L 63/105; H04L 63/0272; H04L 63/0823; H04L 63/101; H04L 63/1408; G06K 9/6256
See application file for complete search history.

(56) References Cited

U.S. PATENT DOCUMENTS

| | | | | |
|---|---|---|---|---|
| 11,178,007 | B1* | 11/2021 | Belton, Jr. | .............. H04L 41/12 |
| 2017/0118240 | A1* | 4/2017 | Devi Reddy | .......... G06N 7/005 |
| 2018/0324219 | A1* | 11/2018 | Xie | ..................... H04L 63/0209 |

(Continued)

*Primary Examiner* — Joseph P Hirl
*Assistant Examiner* — Ka Shan Choy

(57) ABSTRACT

The current document is directed to methods and systems that generate microsegmentation quotients for computational entities and components of a distributed-computer-system. In the described implementation, microsegmentation quotients are generated for each component, subsystem, or computational entity, collectively referred to as "system entities," of a set of specified system-entity types within the distributed computer system. Microsegmentation quotients are generated for system entities at any of the various hierarchical levels within a distributed computer system, including for the entire distributed computer system. Microsegmentation quotients are generated by an iterative process that refines initial estimates of the microsegmentation quotients for system entities within the distributed computer system. Microsegmentation quotients are displayed, through system-management interfaces, to administration and management personnel and provided to automated administration-and-management-system tools and facilities in order to facilitate analysis and monitoring of distributed-computer-system security as well as to facilitate rapid and accurate detection and amelioration of security-related deficiencies and problems.

20 Claims, 37 Drawing Sheets

(56) References Cited

U.S. PATENT DOCUMENTS

2019/0258804 A1\* 8/2019 Glenn ..................... H04L 63/20
2019/0258807 A1\* 8/2019 DiMaggio ............. G06F 21/577
2020/0175320 A1\* 6/2020 Panging ............... G06K 9/6218

\* cited by examiner

| VMs | security state |
|---|---|
| VM36:H3 | secure |
| VM39:H3 | secure |
| VM42:H4 | secure |
| VM44:H4 | secure |
| VM101:H4 | ! warning |
| VM66:H4 | secure |
| VM84:H5 | secure |
| VM90:H5 | secure |
| VM91:H5 | secure |
| VM30:H5 | NOT SECURE |
| VM72:H6 | secure |
| VM73:H6 | secure |
| VM84:H6 | secure |
| VM88:H7 | secure |
| VM21:H7 | ! warning |
| VM23:H7 | secure |
| VM24:H7 | secure |
| VM17:H8 | NOT SECURE |
| VM13:H8 | secure |
| VM16:H8 | secure |
| VM9:H9 | secure |
| VM117:H9 | secure |

METHODS AND SYSTEMS THAT GENERATE AND USE MICROSEGMENTATION QUOTIENTS FOR SECURITY MONITORING OF DISTRIBUTED-COMPUTER-SYSTEM COMPONENTS

TECHNICAL FIELD

The current document is directed to distributed-computer-systems and, in particular, to methods and systems that generate microsegmentation quotients for distributed-computer-system computational entities and components and that use microsegmentation quotients for analyzing, monitoring, and improving system security.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computer systems with hundreds of thousands, millions, or more components that provide enormous computational bandwidths and data-storage capacities. These large, distributed computer systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computer systems appears likely to continue well into the future.

As the complexity of distributed computer systems has increased, the management and administration of distributed computer systems has, in turn, become increasingly complex, involving greater computational overheads and significant inefficiencies and deficiencies. In fact, many desired management-and-administration functionalities are becoming sufficiently complex to render traditional approaches to the design and implementation of automated management-and-administration systems impractical, from a time and cost standpoint, and even from a feasibility standpoint. One example are the many different automated and semi-automated security features and security subsystems incorporated into automated management-and-administration systems to monitor distributed computer systems for insecure configurations and operational behaviors, which are increasingly vulnerable to attack from malicious external entities, viruses-containing communications, improperly functioning components, and other security breaches and threats. Designers and developers of various types of automated management-and-administration facilities incorporated into, or associated with, distributed computer systems are seeking new and improved approaches to securing distributed computer systems.

SUMMARY

The current document is directed to methods and systems that generate microsegmentation quotients for computational entities and components of a distributed-computer-system. In the described implementation, microsegmentation quotients are generated for each component, subsystem, or computational entity, collectively referred to as "system entities," of a set of specified system-entity types within the distributed computer system, Microsegmentation quotients are generated for system entities at any of the various hierarchical levels within a distributed computer system, including for the entire distributed computer system. Microsegmentation quotients are generated by an iterative process that refines initial estimates of the microsegmentation quotients for system entities within the distributed computer system. Microsegmentation quotients are displayed, through system-management interfaces, to administration and management personnel and provided to automated administration-and-management-system tools and facilities in order to facilitate analysis and monitoring of distributed-computer-system security as well as to facilitate rapid and accurate detection and amelioration of security-related deficiencies and problems.

BRIEF DESCRIPTION OF THE DRAWINGS

FIGS. 25A-B illustrates display, by an automated administration-and-management system, of MSQ values generated by the currently disclosed MSQ-value-generation process.

DETAILED DESCRIPTION

Figure 1:
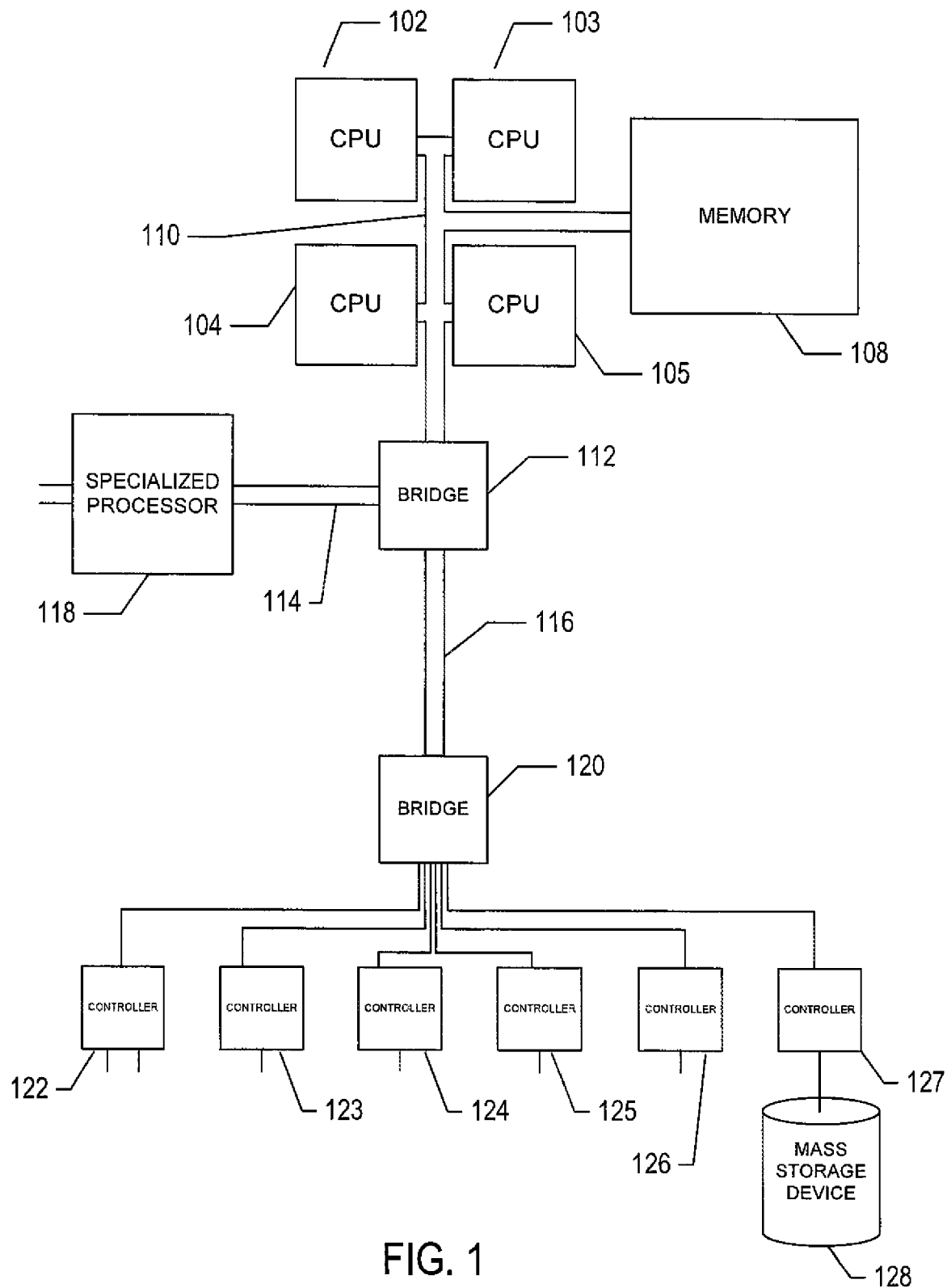
FIG. 1 provides a general architectural diagram for various types of computers.

The current document is directed to methods and systems that generate microsegmentation quotients for system entities of a distributed computer system and that use microsegmentation quotients for analyzing, monitoring, and improving distributed-computer-system security. In a first subsection, below, a detailed description of computer hardware, complex computational systems, and virtualization is provided with reference to FIGS. 1-10. In a second subsection, the currently disclosed methods and systems are discussed with reference to FIGS. 11-25B.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
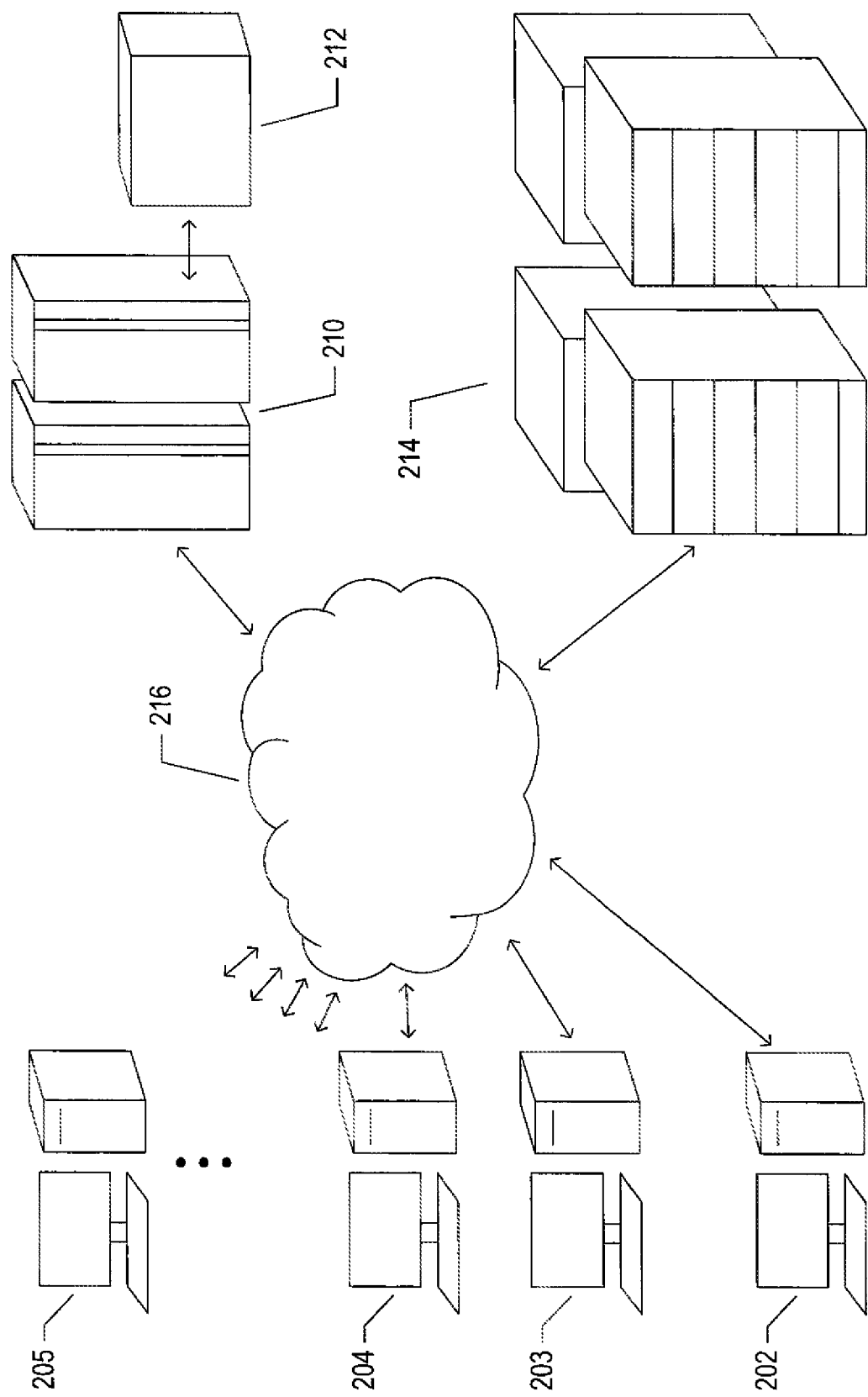
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, distributed computer system networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
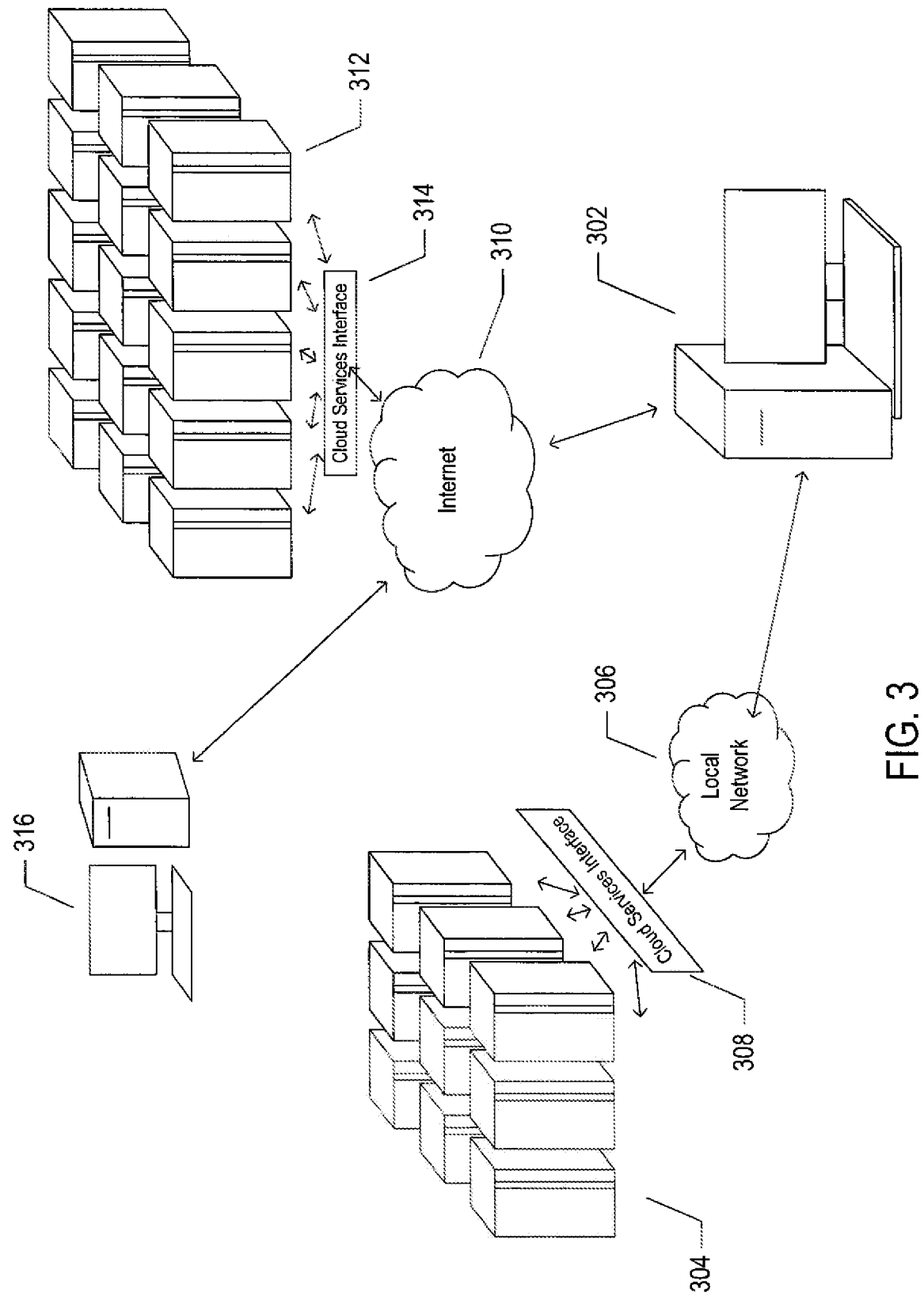
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
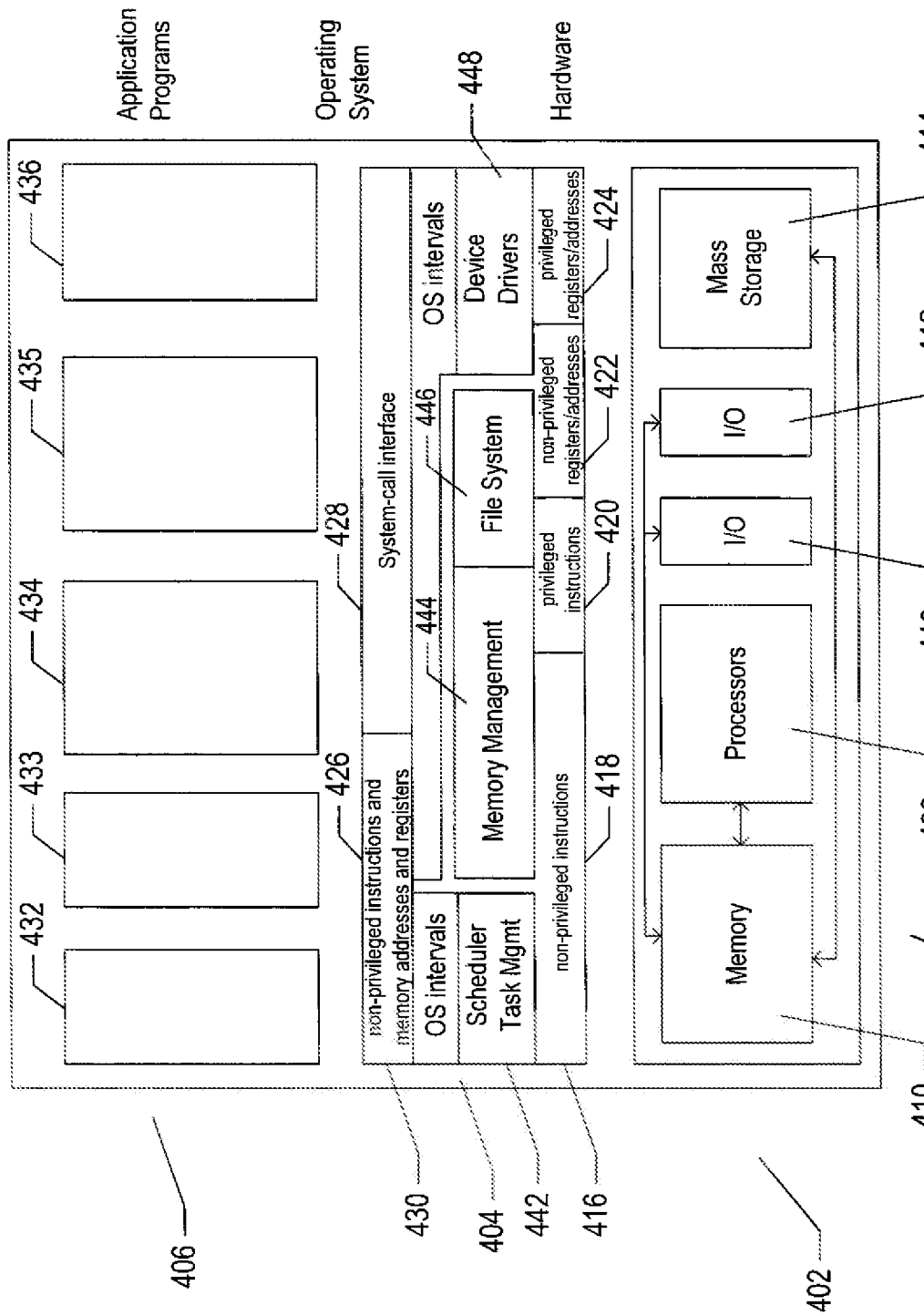
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
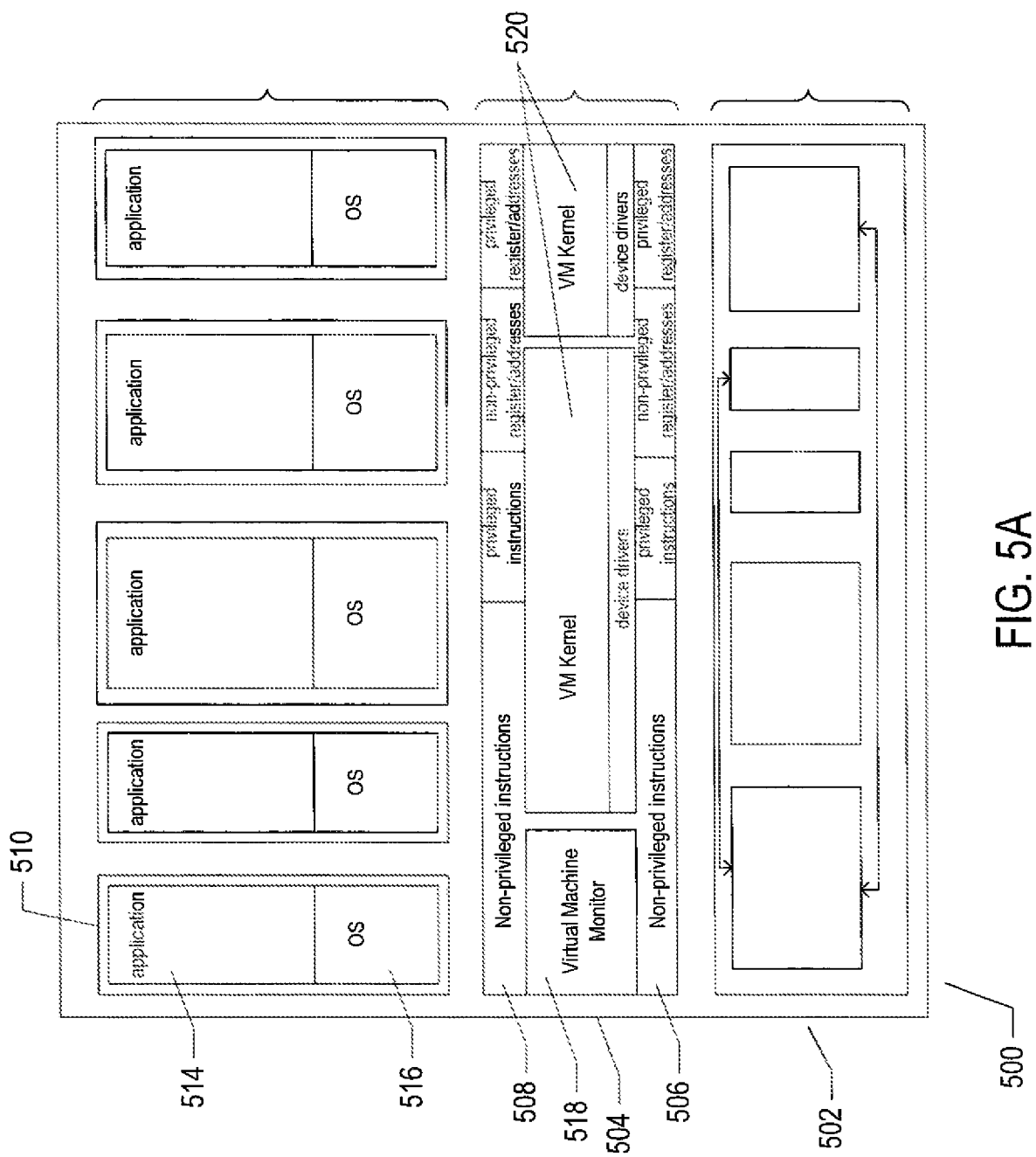
FIGS. 5A-D illustrate two types of virtual machine and virtual-machine execution environments.
Figure 5B:
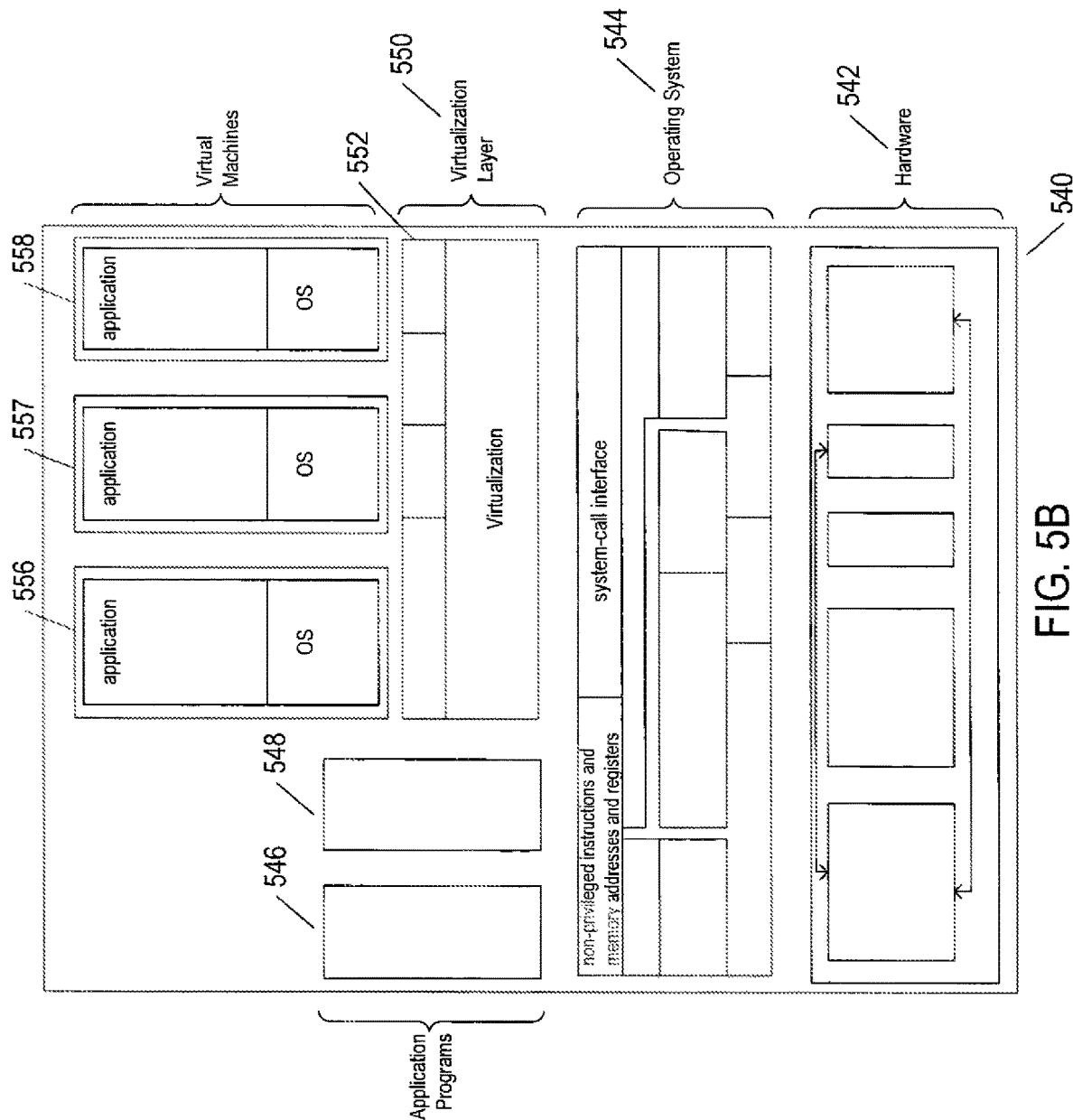

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
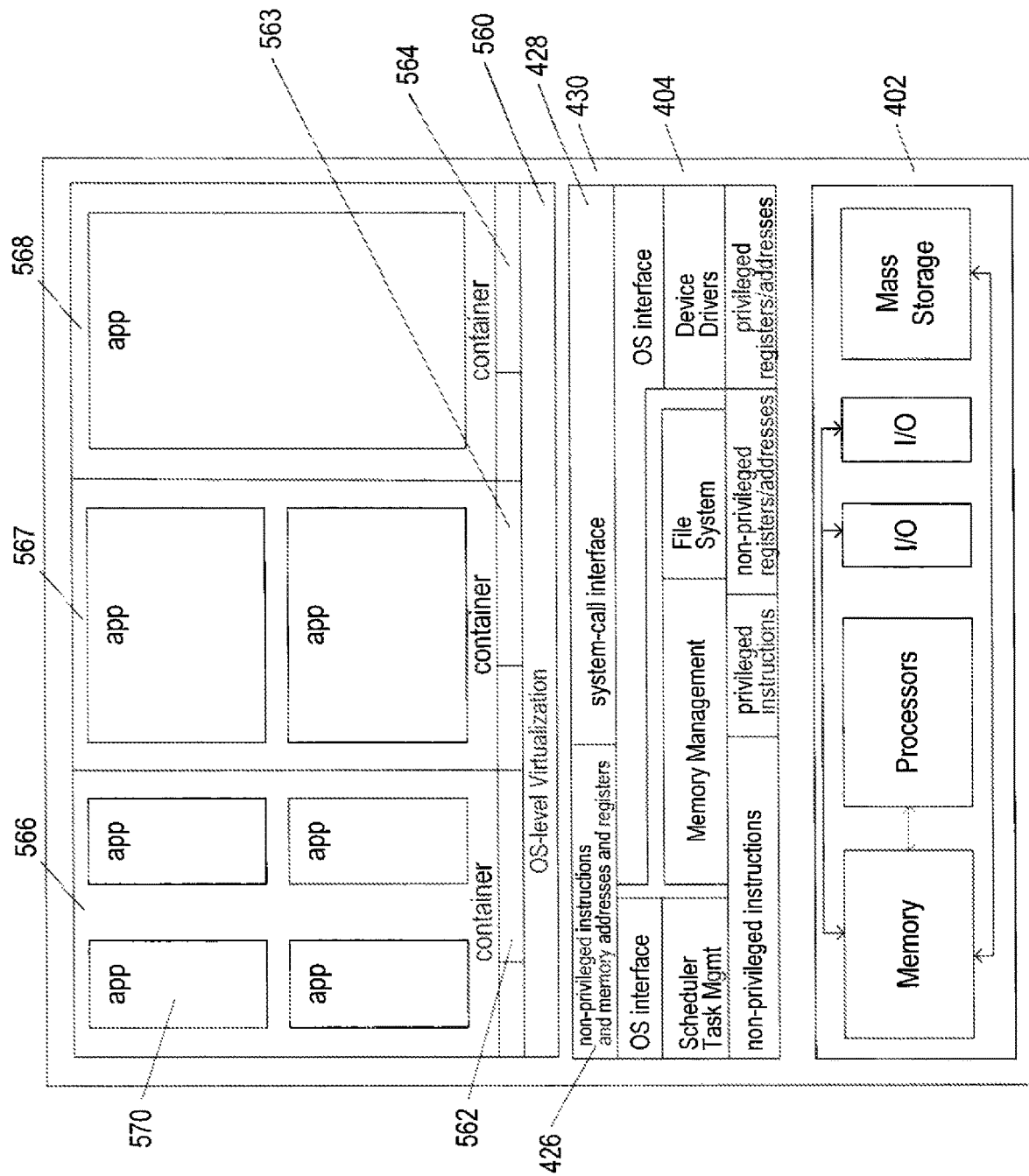

While the traditional virtual-machine-based virtualization layers, described with reference to FIGS. 5A-B, have enjoyed widespread adoption and use in a variety of different environments, from personal computers to enormous distributed computer systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however. OSL virtualization does not provide many desirable features of traditional virtualization. As mentioned above. OSL virtualization does not provide a way to run different types of operating systems for different groups of containers within the same host system, nor does OSL-virtualization provide for live migration of containers between host computers, as does traditional virtualization technologies.

Figure 5D:
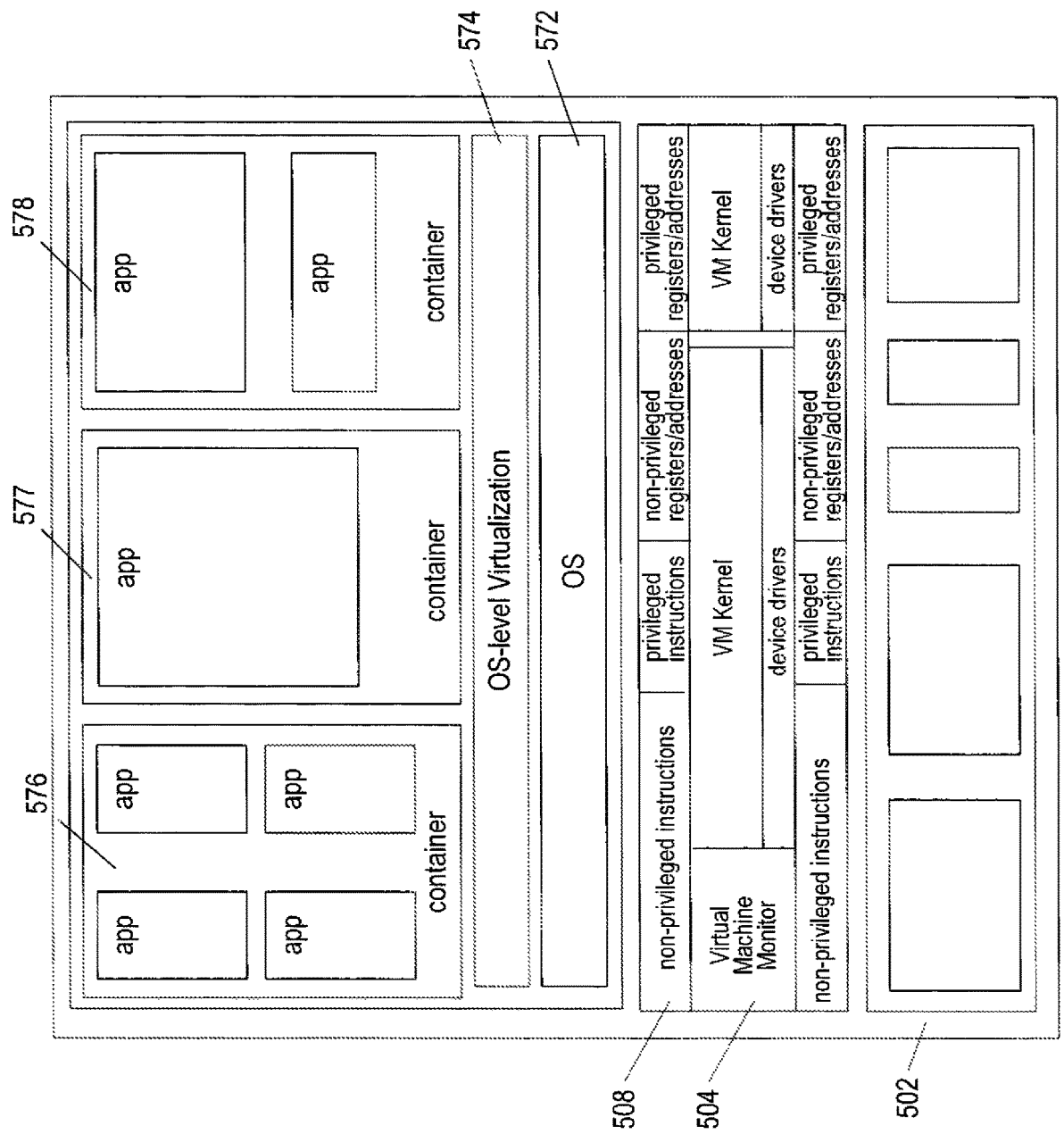

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
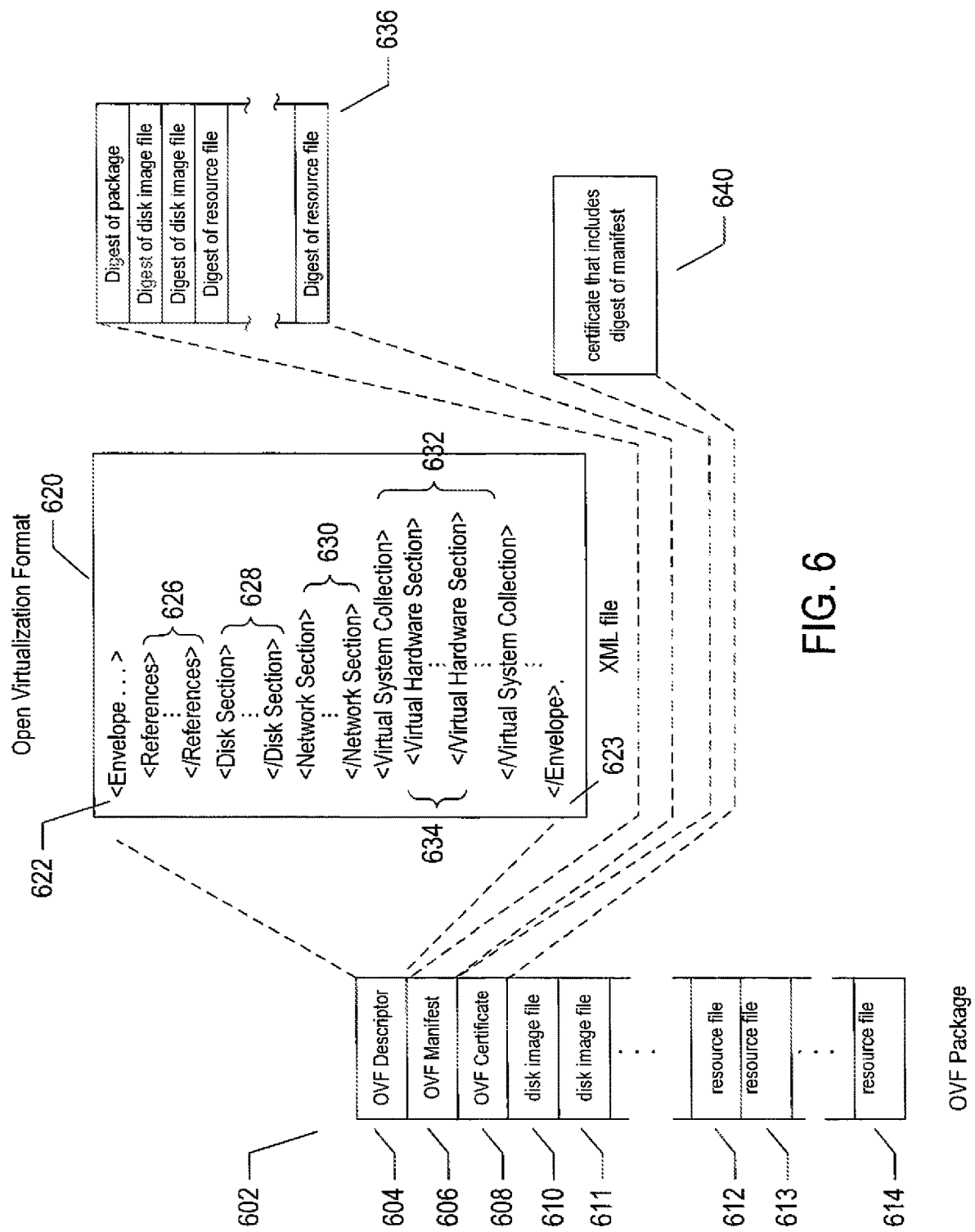
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
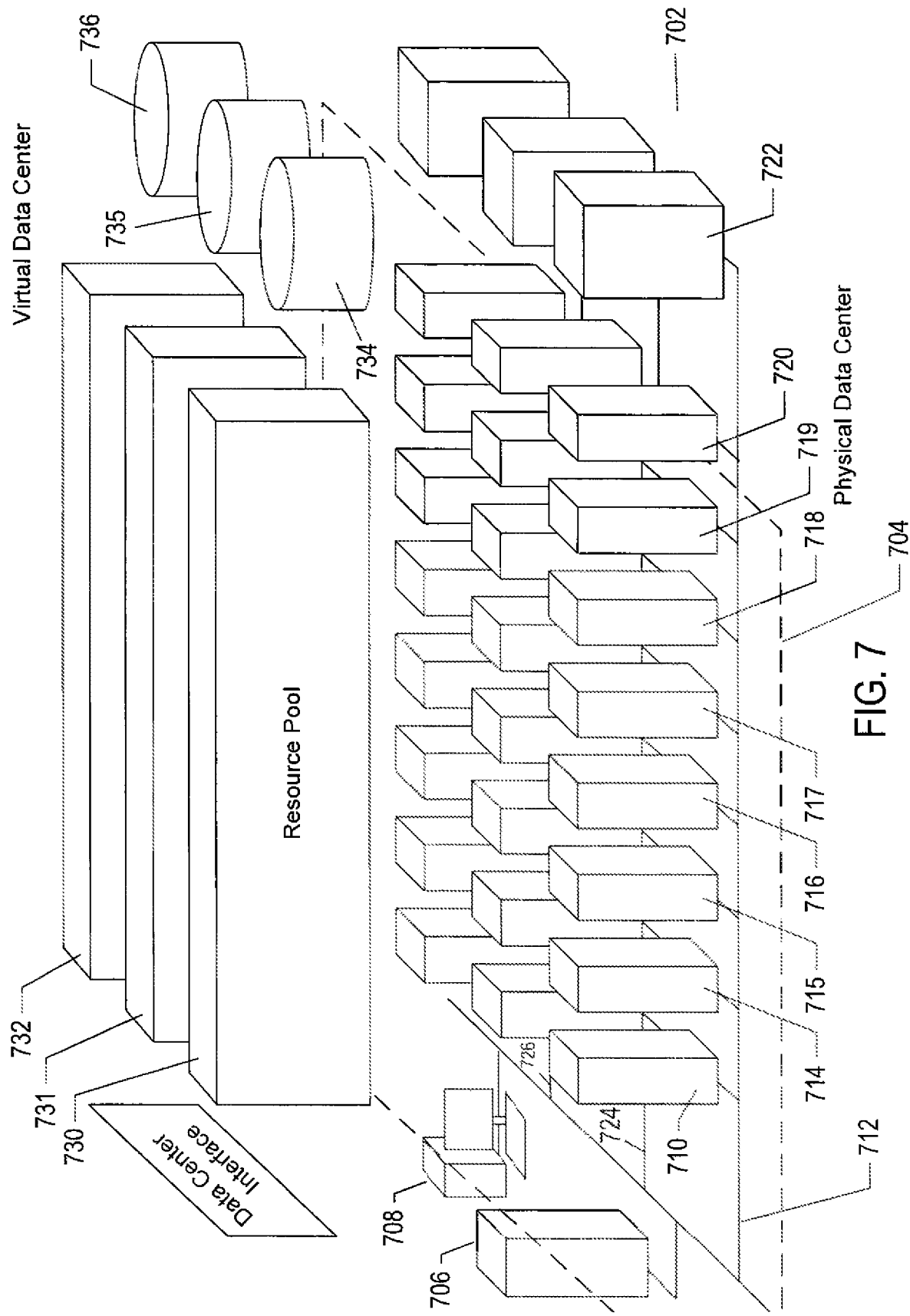
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
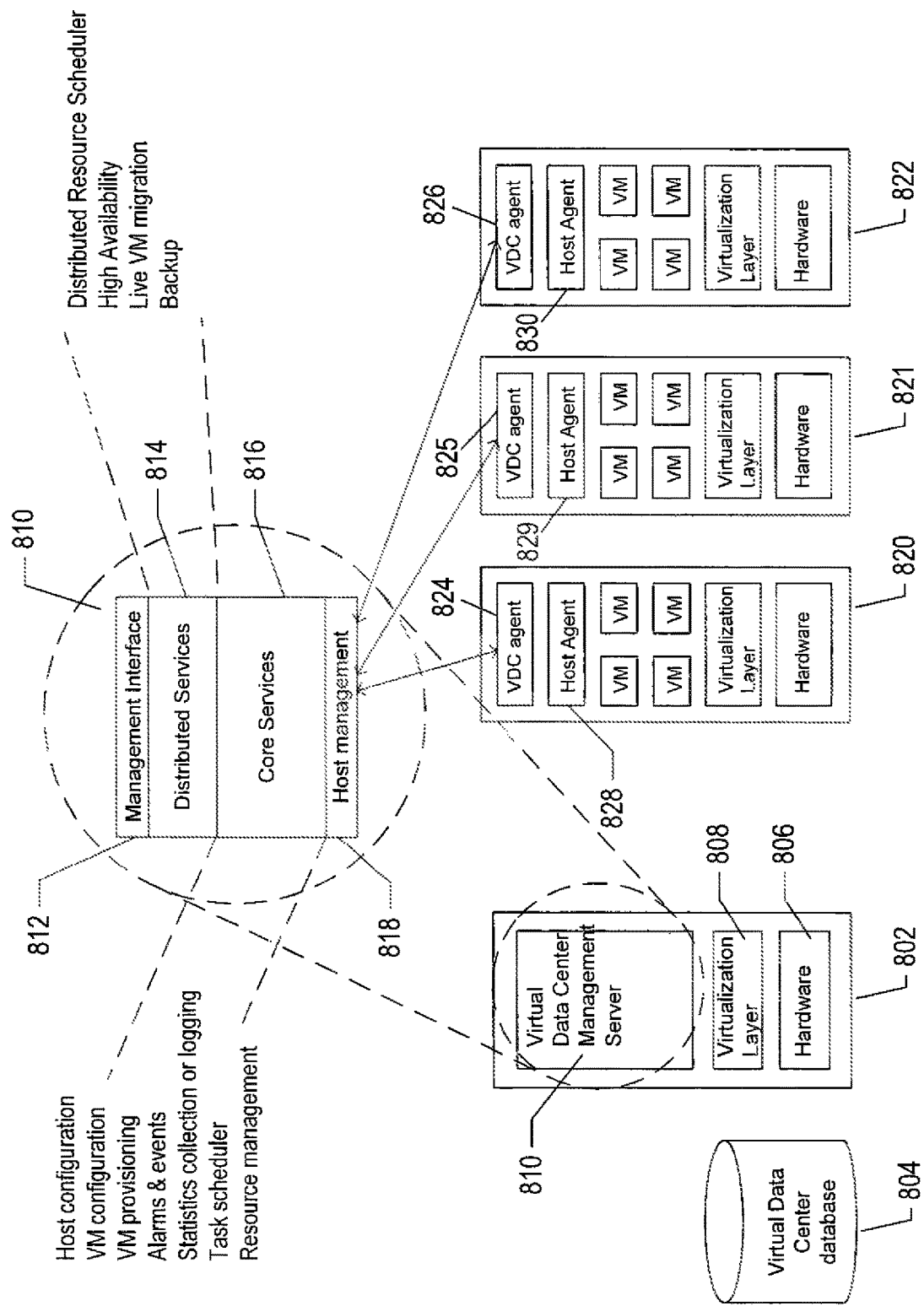
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
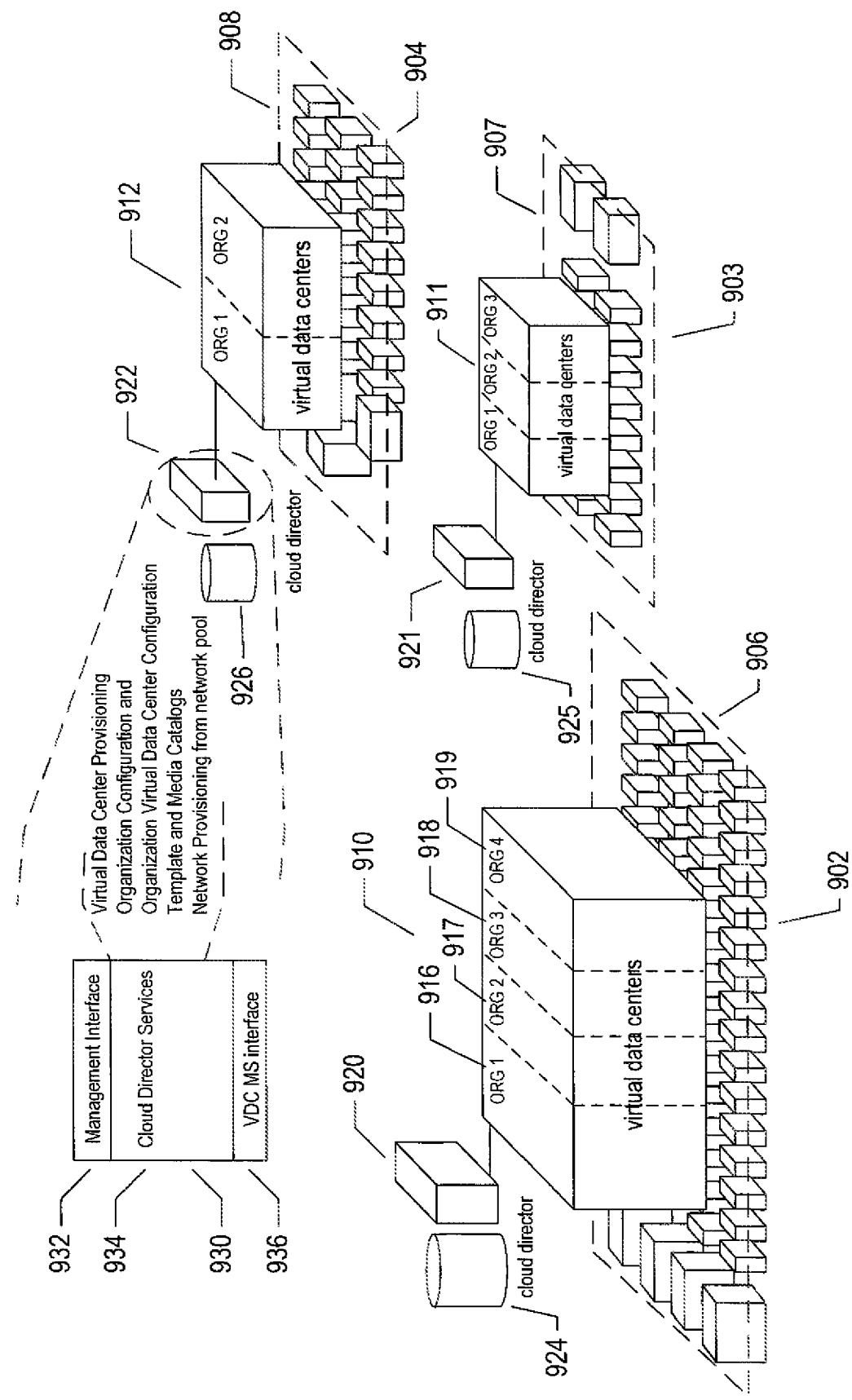
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
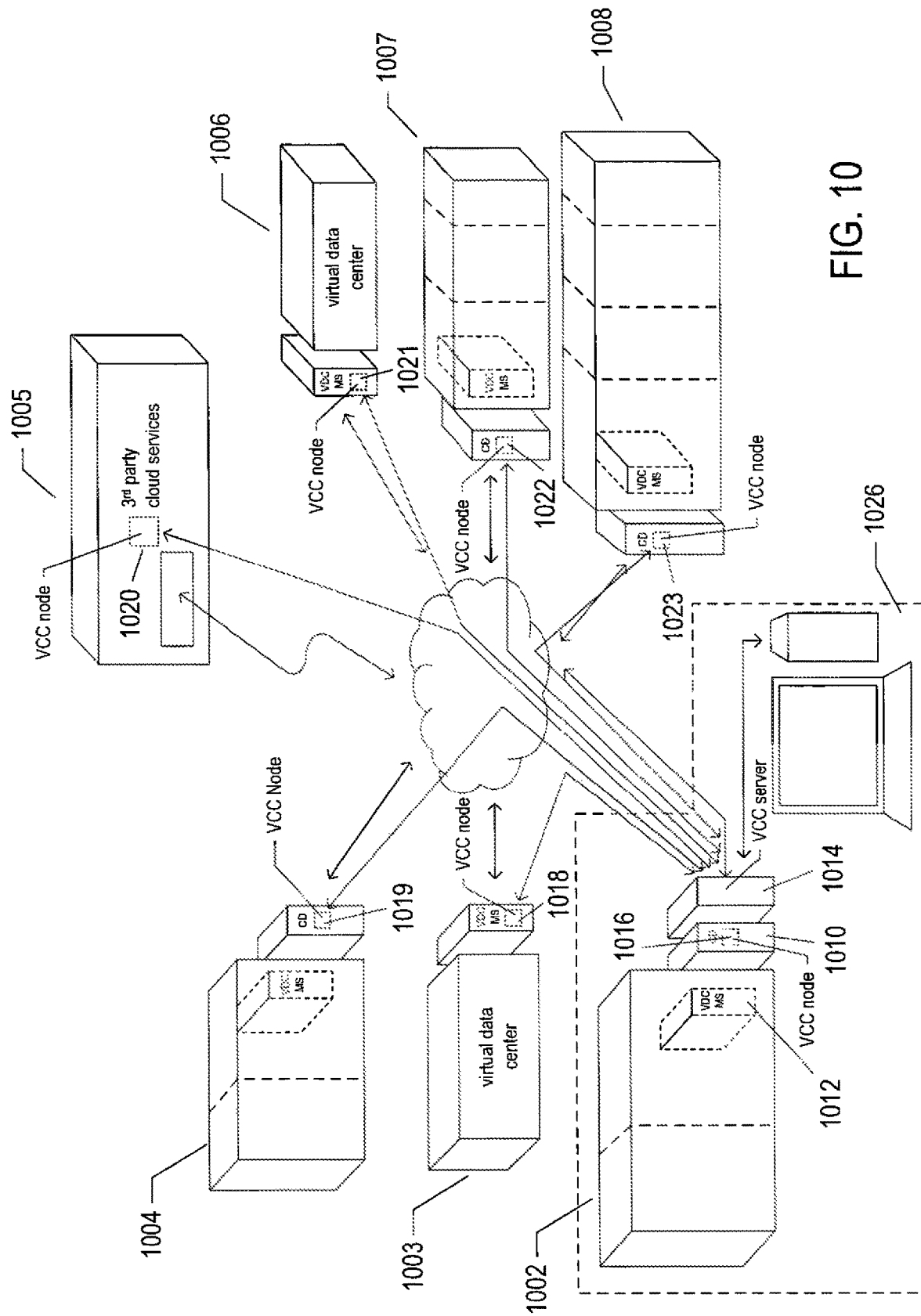
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

The field of computer security has developed, over the span of the past 70 years, from rudimentary building security measures for securing human access to facilities in which computers are located to complex, automated and semi-automated security systems and internal security subsystems and features that protect computer systems not only from human physical access, but also from a wide variety of different types of electronic-communications-based access and access through ingestion of externally generated data and insecure executables. During the past few years, a new security paradigm, referred to as "microsegmentation," has been proposed. Microsegmentation security features have been developed and incorporated within automated distributed-computer-system management-and-administration systems, and are currently rapidly evolving.

Figure 11:
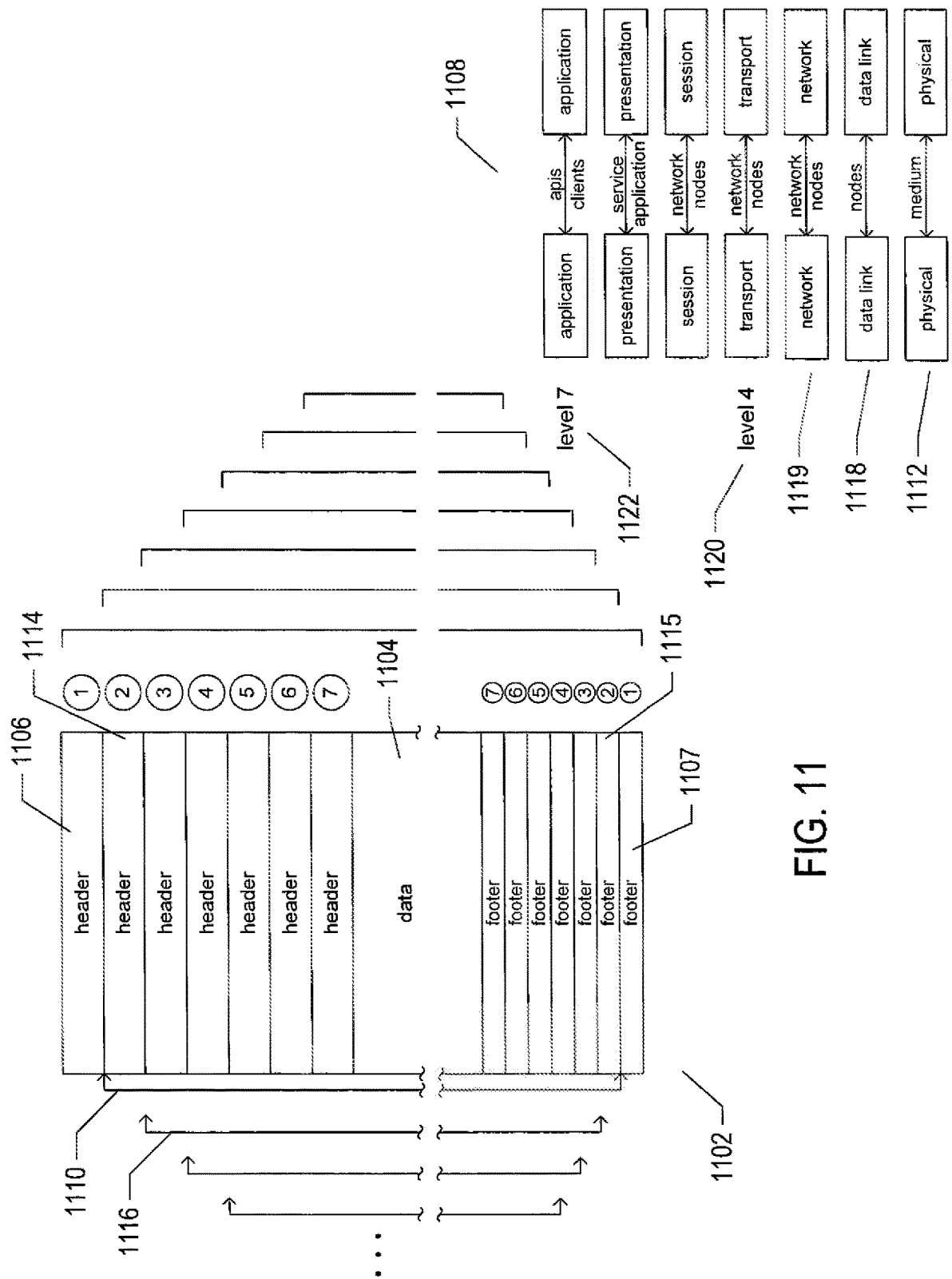
FIG. 11 illustrates the meaning of the phrases "level 4" and "level 7," initially used in describing communications protocols, but now frequently used in the context of distributed-computer-system security.

FIG. 11 illustrates the meaning of the phrases "level 4" and "level 7," initially used in describing communications protocols, but now frequently used in the context of distributed-computer-system security. Packets transported through electronic communications media, such as local-area networks and distributed computer system networks, including the Internet, are often described by an abstract logical model 1102. A packet can be thought of as a block of data 1104 contained within nested levels of packet headers and footers. Each pair of a header and footer, such as header 1106 and footer 1107, contain information related to a protocol level within a protocol stack 1108. Information contained in headers and footers allow for transmission of messages to particular recipients, various types of error-control coding, sequencing of multiple, related messages, synchronization and timing, and various other protocol-implemented features of electronic communications. In FIG. 11, header 1106 and footer 1107 can be thought of as the header and footer of a first-protocol-level message, corresponding to a first level 1112 in the protocol stack 1108, that includes a data block spanning the remainder of the packet. Header 1114 and footer 1115 can be thought of as a second-protocol-level packet, corresponding to the second protocol level 1118 in the protocol stack 1108, embedded within the first-protocol-level packet. The third protocol level 1119 is referred to as the "network layer," and is responsible for packet transmission between points in a complex network. The fourth protocol level 1120 is referred to as the "transport layer." The transport layer is concerned with reliable transport of data segments, including multi-packet data segments, within a complex network from a source address to a destination address. It is this protocol layer, along with the lower-level protocol layers, that, for example, is responsible for transporting one or more packets corresponding to an email message from a personal computer in one location to a personal computer or server in another location. Thus, the transport layer is concerned with, for example, reliably routing multi-packet messages through the Internet between IP addresses. The seventh level 1122 is concerned with routing messages between applications, such as messages from a web-server application, running within a server in a distributed computer system, to a user accessing the website served by the web-server through a browser application. Thus, as a simplification, the phrase "level 4" is related to message transmission between particular computers while the phrase "level 7" is related to message transmission between applications executing on computer systems.

Figure 12:
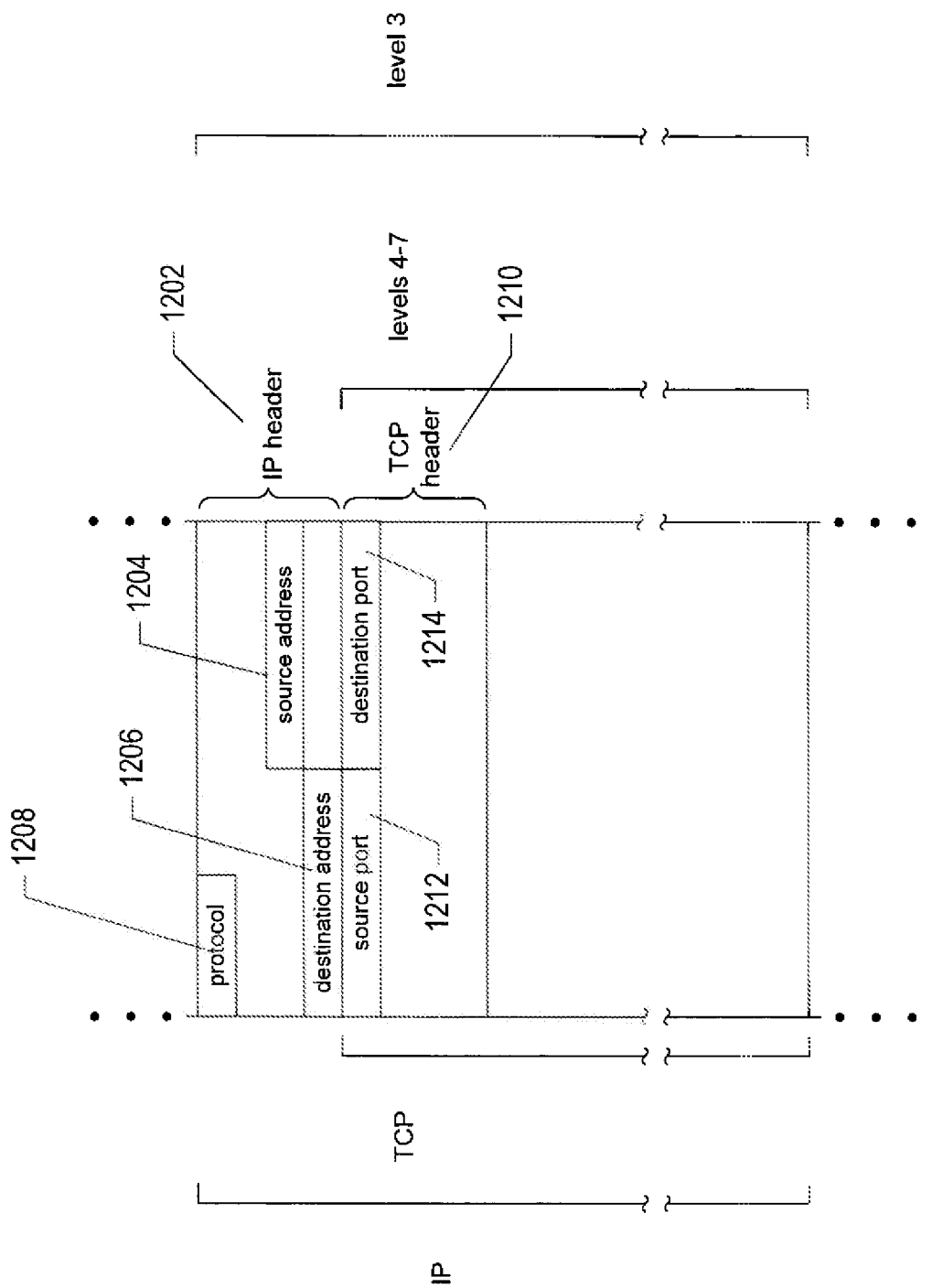
FIG. 12 illustrates the TCP/IP protocol stack and packet organization, widely used in computer networking.

FIG. 12 illustrates the TCP/IP protocol stack and packet organization, widely used in computer networking. While the abstract logical model, discussed above with reference to FIG. 11, is used for theoretical discussions and as a conceptual standard for networking, TCP/IP is a real-world protocol. The IP header 1202 includes a source IP address and a destination IP address 1206 as well as a protocol-version indication 1208, among other fields. The IP header corresponds to the third protocol level in the above-discussed abstract logical model. The TCP header 1210 includes indications of a source port 1212 and a destination port 1214, among other fields, and corresponds to levels 4-7 of the abstract logical model discussed above with reference to FIG. 11.

Figure 13:
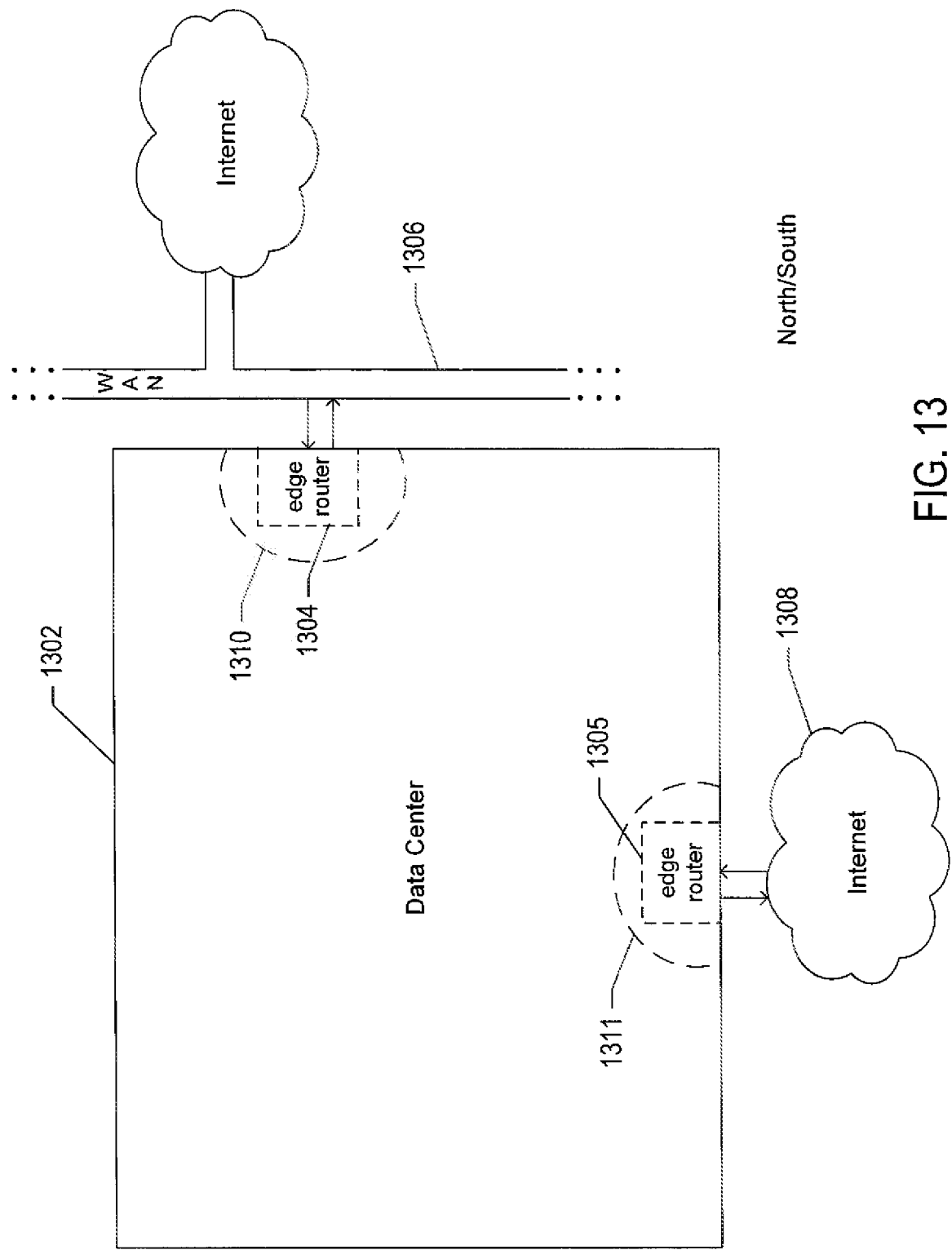
FIG. 13 illustrates traditional security features for distributed computer systems, including data centers.

FIG. 13 illustrates traditional security features for distributed computer systems, including data centers. A data center 1302 is represented, in FIG. 13, by a large rectangle. The only components within the data center shown in FIG. 13 are two edge routers 1304-1305. The edge routers connect internal local-area networks within a data center to an external wide-area network 1306, in one case, and directly to the Internet 1308, in another case. Traditionally, security features for data centers and other distributed-computer systems were concerned with constructing internal barriers 1310-1311 around edge routers in order to protect internal components of the distributed-computer systems, including local-area networks, server computers, and data-storage appliances, from undesired access by external entities. This type of security feature is referred to as an example of "level-4 security." This is because many of the particular security features in this class of security features and subsystems rely on filtering incoming and outgoing network traffic based on source and destination IP addresses and other information generally contained in level-4 headers and lower-protocol-level headers. The type of network traffic filtered by these security features is also referred to as "north/south" network traffic. These types of security features are still widely used and represent an extremely important component of the overall security-related features and subsystems within modern distributed-computer systems.

Figure 14:
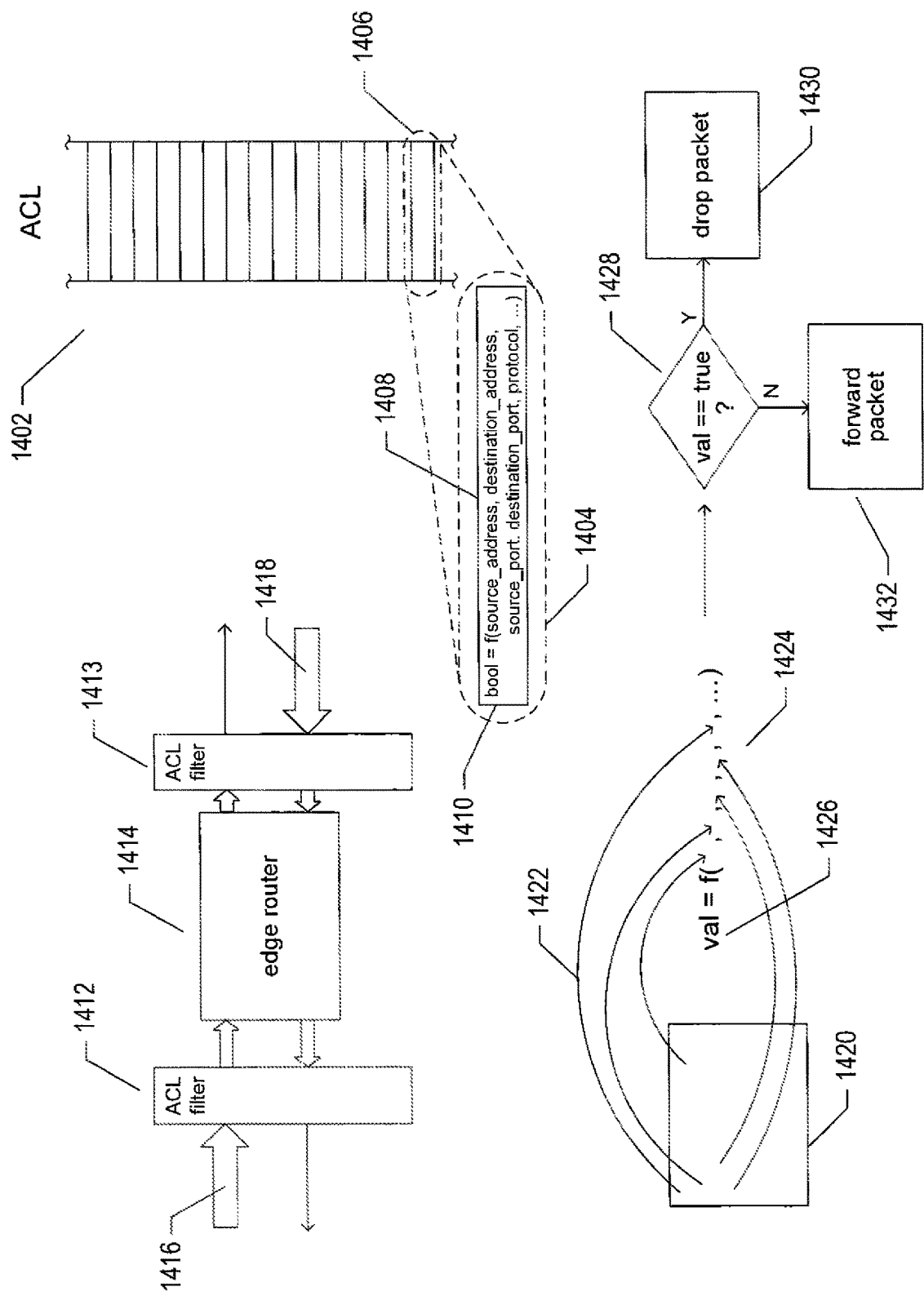
FIG. 14 illustrates one type of traditional security feature, referred to as an "access-control list."

FIG. 14 illustrates one type of traditional security feature, referred to as an "access-control list." An access-control list ("ACL") 1402 is a list of access rules, such as the access rule shown in inset 1404 corresponding to entry 1406 in ACL 1402. In this particular type of ACL implementation, the access rule takes, as arguments, information extracted from the headers of a TCP/IP packet 1408 and returns a Boolean value 1410 indicating whether or not the packet should be passed through an ACL filter or dropped. In one type of ACL-based security feature. ACL filters 1412-1413 are placed on both sides of an edge router 1414. Traffic incoming from the external environment 1416 passes through a first ACL filter 1412 that is associated with a first ACL. Externally generated packets are filtered by the first ACL filter according to the access rules in the first ACL. The packets then pass through the edge router, which outputs packets with internal-network addresses that direct the packets to internal components of a distributed computer system.

The packets output by the edge router 1414 are filtered by the second ACL filter 1413 based on access rules in a second ACL associated with the second ACL filter. Similarly, packets transmitted to the edge router from internal components of the distributed computer system 1418 are filtered by the second ACL filter 1413 before reaching the edge router 1414. Packets output by the edge router 1414 to external networks are filtered by the first ACL filter 1412. In certain implementations, each ACL filter 1412 and 1413 may use a separate ACL for each of the two packet-transmission directions. An ACL filter evaluates each access rule in the relevant ACL for each packet input to the ACL filter. Information is extracted from the headers within a packet 1420, as represented by curved arrows, such as curved arrow 1422, and input to an access rule 1424 to generate a resultant Boolean value 1426. When the Boolean value is TRUE, as determined in step 1428, the packet is dropped, or filtered from the packet stream, 1430. Otherwise, the packet is forwarded to downstream communication components 1432.

Figure 15:
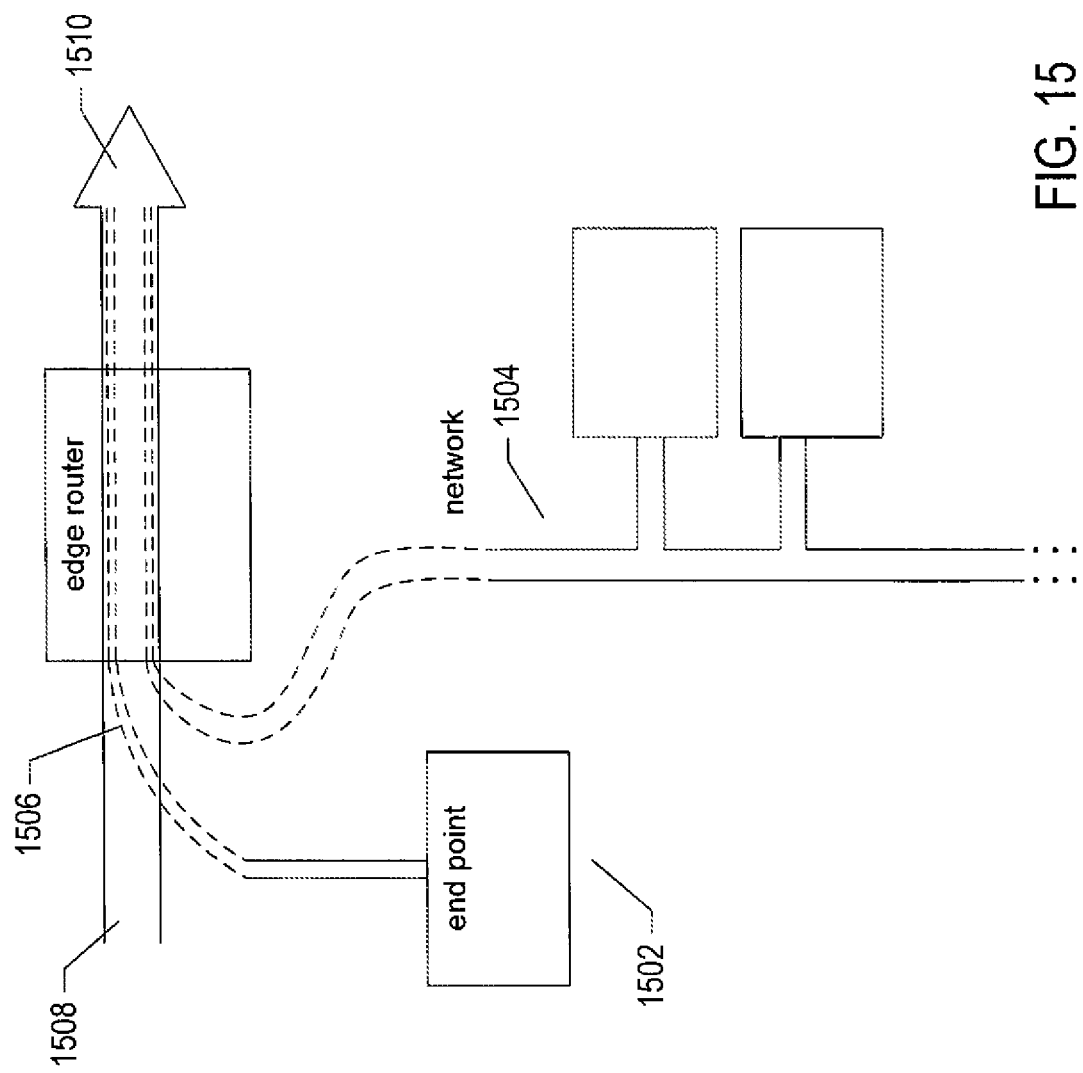
FIG. 15 illustrates another type of traditional security feature referred to as a "virtual private network."

FIG. 15 illustrates another type of traditional security feature referred to as a "virtual private network." A virtual private network ("VPN") interconnects external computers 1502 and external networks 1504 to internal components within a distributed computer system. There are many different types of VPNs. In one type, a tunneling protocol creates a tunnel 1506 within the networks 1508 and 1510 that communicate traffic between the entities interconnected by the VPN. In addition, data included in the tunneling-protocol packets is encrypted by the source entity and decrypted by destination entity. The VPN logic ensures that only packets coming from a VPN endpoint are forwarded into the distributed computer system and that only packets coming from VPN endpoints within the distributed computer system are forwarded outward to the external network 1508. Many additional security features can be incorporated within VPN implementations.

Figure 16:
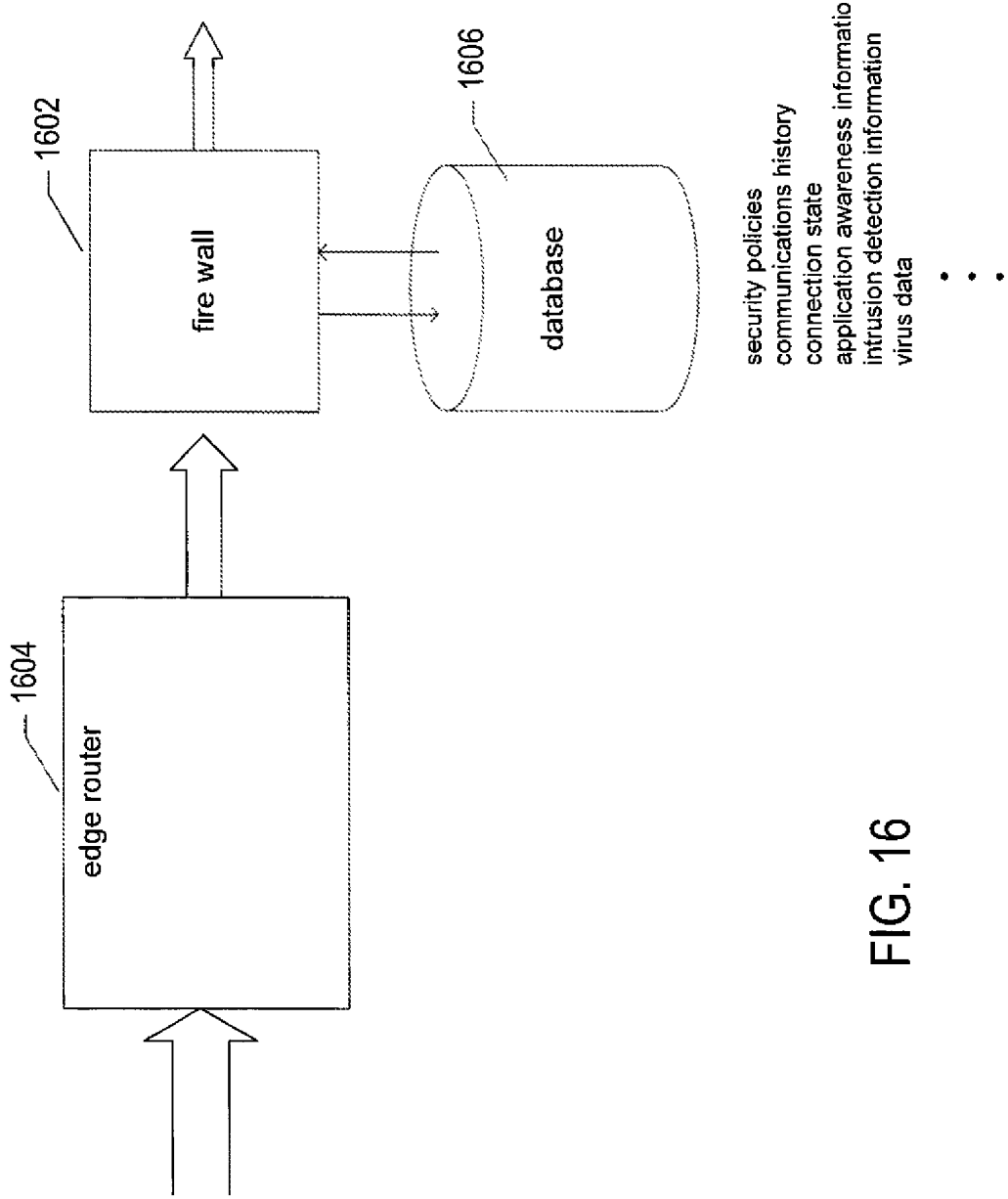
FIG. 16 illustrates yet another type of traditional security feature referred to as a "firewall."

FIG. 16 illustrates yet another type of traditional security feature referred to as a "firewall." In certain ways, a firewall 1602 is similar to the previously discussed ACL. In the example shown in FIG. 16, traffic from external entities passing through an edge router 1604 is filtered by the firewall 1602 which, like an ACL filter, either forwards input packets on to internal components of a distributed computer system or drops the packets, depending on various criteria. However, unlike an ACL filter, many firewalls are stateful, rather than stateless, and can employ stored data 1606 during evaluation of packets for forwarding or dropping. Firewalls monitor and store information regarding the packets processed by the firewall and can monitor and store information regarding the connection-state contexts to which packets belong. Firewalls collect intrusion-detection information and application-awareness information. Firewalls use stored information for evaluating and applying security policies and applying various types of filters and detection methodologies for detecting viruses and other malicious packet content.

Figure 17:
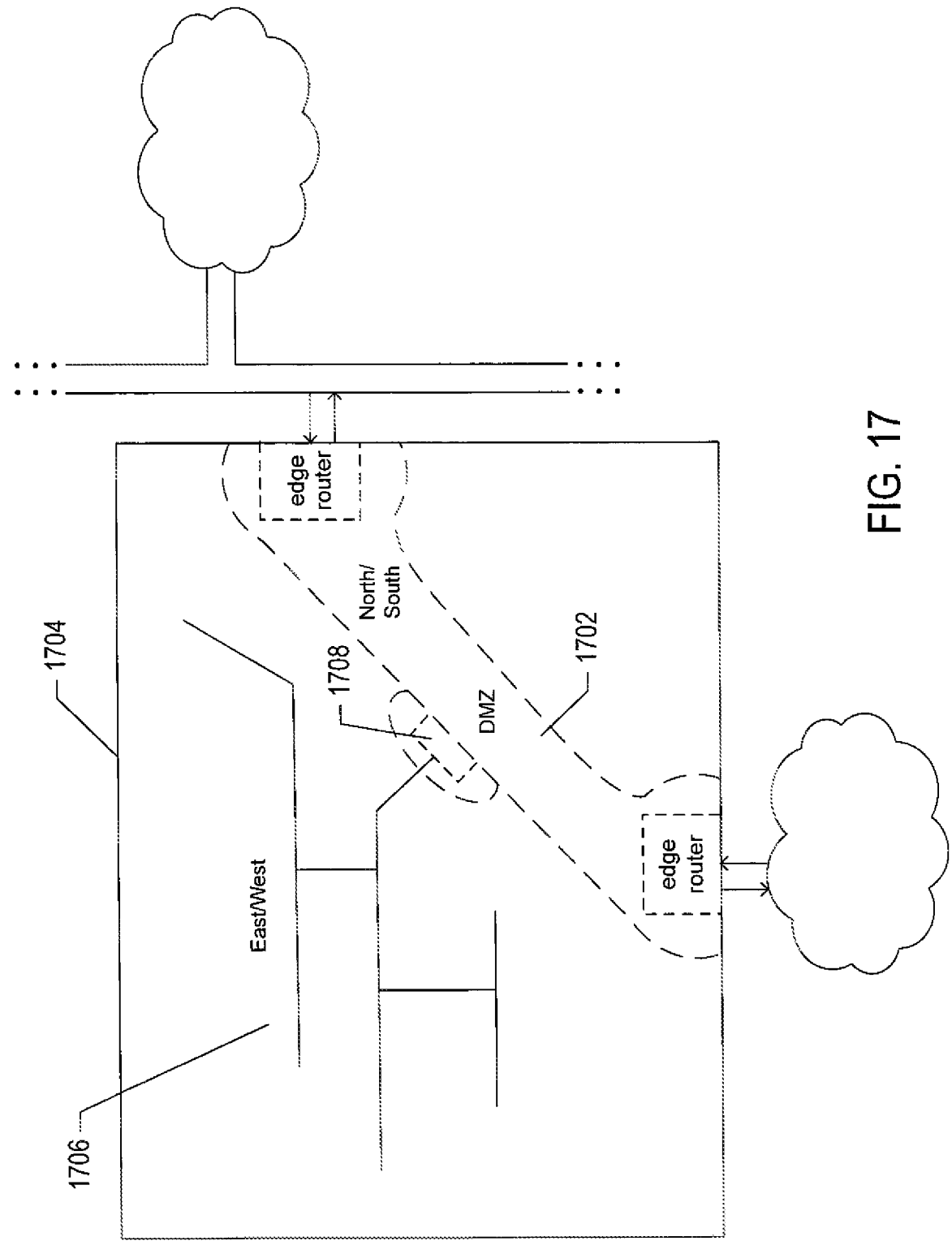
FIG. 17 illustrates establishment of an internal DMZ within a distributed computer system.

More recently, security features and subsystems within distributed computer systems began to seek to provide more elaborate internal security barriers. FIG. 17 illustrates establishment of an internal demilitarized zone ("DMZ") within a distributed computer system. The DMZ 1702 uses various security features and technologies to isolate internal distributed-computer-system 1704 components, which directly interconnect with computational entities external to the distributed computer system, from internal local-area networks 1706 and the remaining internal components of the distributed computer system. Internal routers, such as a router 1708, that connect the internal local-area networks with communications media within the DMZ are protected by various of the traditional security technologies discussed above and additional security technologies. The DMZ is directed to protecting the distributed computer system from security threats in north/south communications traffic. The internal network traffic transmitted through internal local-area networks is referred to as "eastwest" traffic.

An even more recent security paradigm, mentioned above, is referred to as "microsegmentation." Microsegmentation is concerned with applying security technologies to the east/west traffic in addition to the applying the above-discussed traditional security technologies that are largely directed to north/south traffic. A significant portion of east/west traffic consists of data messages transmitted between different components of distributed applications, between service applications and distributed applications, and between different distributed applications. Thus, security methods applied to east/west traffic are often considered to be level-7 security methods, since they often employ information obtained from application-level packet headers. Microsegmentation allows for various different security features and technologies, including those mentioned above with reference to FIGS. 14-16, to be applied at every level of internal-component granularity within a distributed computer system.

Figure 18:
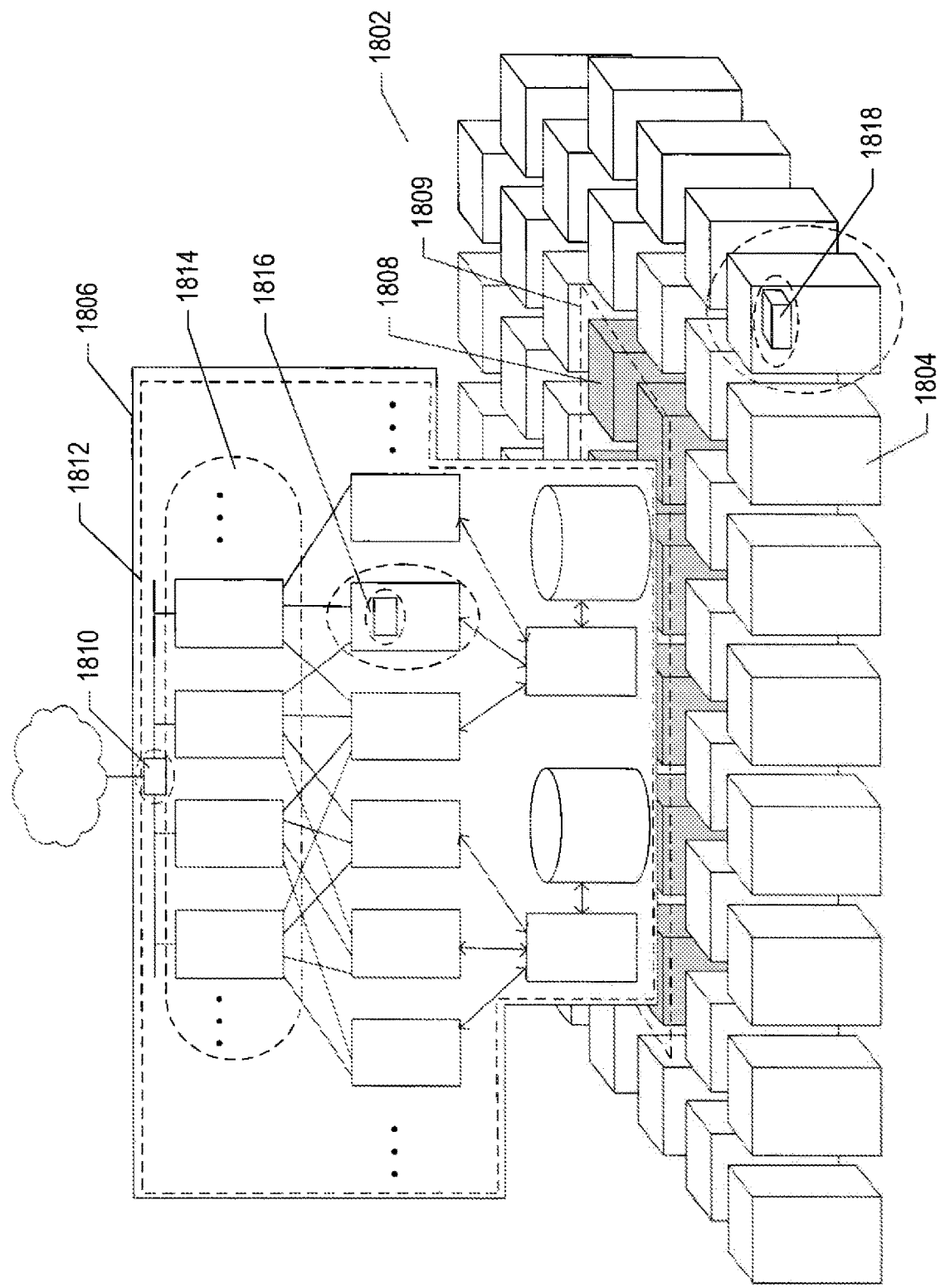
FIG. 18 illustrates an example of microsegmentation.

FIG. 18 illustrates an example of microsegmentation. FIG. 18 shows a portion of a large physical distributed computer system 1802 that includes a large number of servers, such as server 1804. A virtual data center 1806 is implemented within 10 physical servers 1808 indicated by dashed rectangle 1809 and shading in FIG. 18. As discussed above, the physical servers may be protected by various traditional security methods at the DMZ and edge-router level in the component hierarchy. The virtual data center 1806 can be additionally secured using these and other technologies. For example, the virtual data center may include a virtual edge router 1810 that can be protected by ACL filters, firewalls, VPNs, and other types of security technologies, features, and subsystems, in the same way that physical edge routers are protected by these security technologies. This type of protection establishes a security zone, illustrated by dashed rectangle 1812, that encompasses the virtual servers, virtual local-area networks, and virtual data-storage appliances within the virtual data center. In addition, similar, finer-granularity security features, subsystems, and technologies can be used to secure a first layer of virtual servers 1814, distributed applications, and even individual virtual machines 1816 within the virtual data center. In similar fashion, individual virtual machines within physical servers may be associated with various security features, subsystems, and technologies to separately and additionally secure the individual virtual machines 1818. Components at any level of the component hierarchy can be similarly protected by component-level security features and subsystems.

Microsegmentation allows for the introduction of highly specialized security features at every granularity of physical and virtual components within a distributed computer system. By using microsegmentation, the security of a distributed computer system can be greatly increased. For example, should a malicious packet or sequence of packets managed to breach the traditional ACL filters and firewalls protecting a physical data center, the possible scope of affected internal components and the potential seriousness of the damage that may occur, as a result, are both greatly reduced by the presence of low-granularity microsegmentation security features protecting individual virtual machines, individual virtual and physical local-area networks, individual distributed applications, and other such components.

Figure 19:
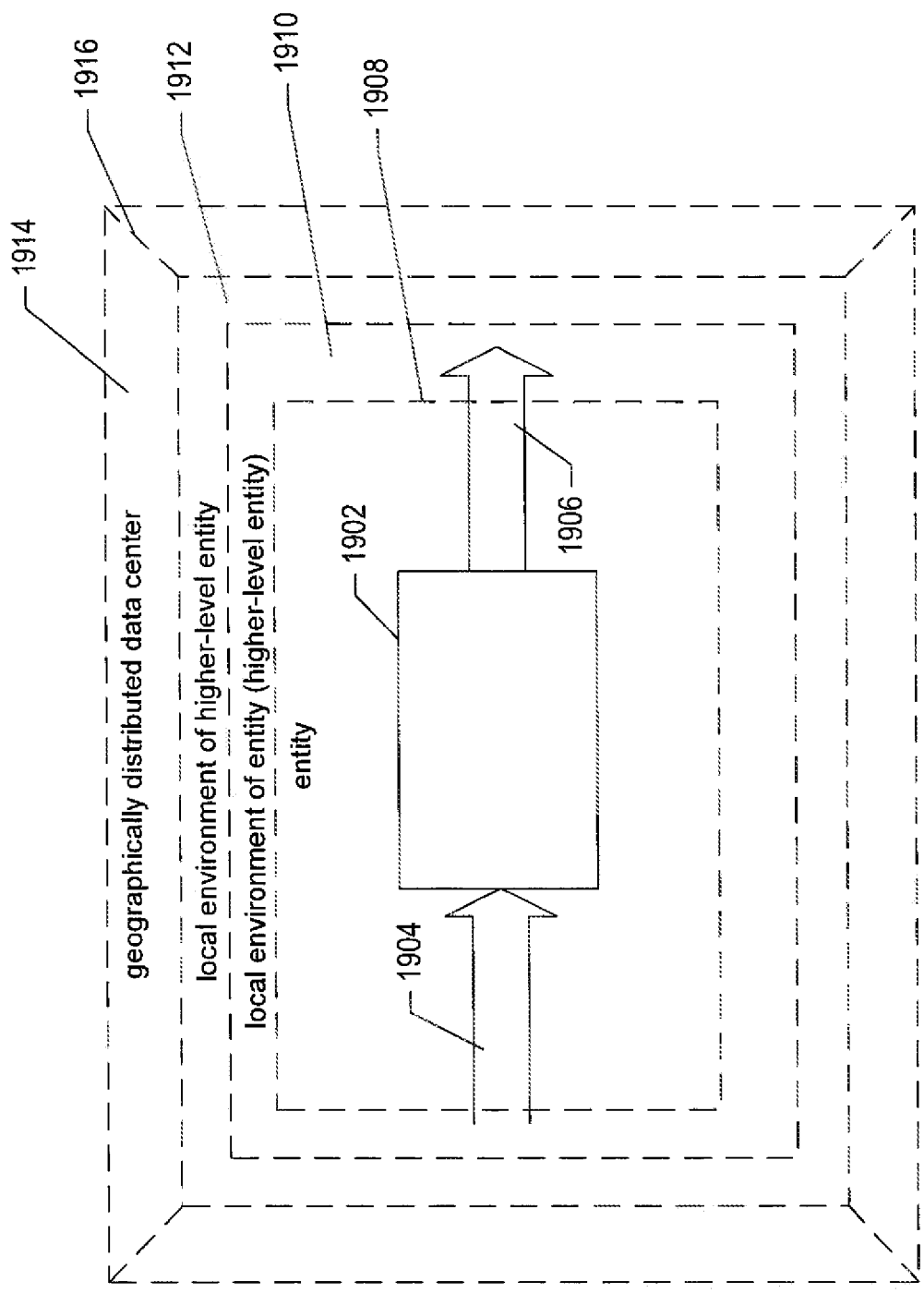
FIG. 19 illustrates the hierarchical nature of the various security zones and environments implemented using microsegmentation.

FIG. 19 illustrates the hierarchical nature of the various security zones and environments implemented using microsegmentation. At the middle of FIG. 19, rectangle 1902 represents a particular system entity, virtual or physical, within a distributed computer system. This may be a virtual machine, a physical server, a level of distributed-application executables within a distributed application, or any of numerous additional types of entities. Arrows 1904 and 1906 represent incoming communications to, and outgoing communications from, the system entity 1902. In general, these communications occur through physical and/or virtual networks, but may more generally include additional types of data and signals input to, and output from, a system entity. The system entity 1902 can be thought of as residing within a local security environment represented by dashed rectangle 1908. The system entity generally resides within a local environment 1910 that may include other system entities of the same type or other system entities with which the system entity 1902 frequently and/or directly communicates. The local environment of the system entity 1910 may, in turn, inhabit a higher-level local environment 1912. For example, if the system entity 1902 is a virtual machine, the immediate local environment 1910 may include a small number of virtual machines interconnected by a virtual network to the system entity while the higher-level environment 1912 may include other virtual machines executing within a particular server or server cluster or, alternatively, may include the physical or virtual server within which the system entity runs. As another example, the component 1902 may be a particular executable running as part of a distributed application, while the local environment 1910 may be a level of distributed-application executables, such as a set of front-end servers, while the higher-level environment 1912 may be the entire distributed application. Because of the hierarchical nature of distributed computer systems, a particular system entity, at whatever level within the distributed computer system, is generally contained within a local environment and one or more higher-level security environment. The highest-level security environment 1914 is the entire distributed data center. Ellipses, such as ellipsis 1916, indicate the possibility of additional intervening security levels.

In some ways, microsegmentation is still an early-stage technology. To date, there are numerous commercial microsegmentation products and implementations, but the technology itself has not yet been standardized. Furthermore, the enormous potential range and flexibility; of this technology for securing complex distributed computer systems has not yet been fully exploited. One significant problem, currently, is that it is very difficult for administrative and management personnel to track and monitor all of the many different hierarchical levels and individual security environments and zones produced using microsegmentation. For example, currently, there is no easy and straightforward method or tool to allow administration and management personnel to understand the relative security provided, by microsegmentation technologies, to individual components and collections of components of a distributed computer system, or an entire distributed computer system using microsegmentation technologies nor any way for administration and management personnel to evaluate the security context of particular components or subsystems in terms of the relative securities of neighboring and related higher-level security environments. The currently disclosed methods and systems were devised to address this fundamental deficiency in current microsegmentation products and implementations.

FIGS. 20A-F illustrate generation of a microsegmentation quotient ("MSQ") for a component or computational entity within a distributed computer system. An MSQ is a scalar metric that reflects the level of security of a system entity within a distributed computer system. In the currently described implementation, an MSQ is an integer value in the range [0,100], but, in other implementations, an MSQ may be either integer-valued or real-number-valued within various different value ranges. In the current implementation, the MSQ value 0 indicates a completely insecure system entity and the MSQ value 100 indicates a fully secure system entity. Of course, in different implementations, the polarity of the range for MSQ values may be inverted.

In the currently described implementation, MSQ values are generated for each system entity of each system-entity type in a set of specified system-entity types. Thus, by the currently disclosed methods and systems, scalar representations of the security levels of the system entities of the specified system-entity types within a distributed computer system are available for rendering and displaying, to administrative and management personnel, an easy-to-understand, simple, textural or graphical representation of the security state of the distributed computer system. Such displayed security-state representations allow administrative and management personnel to understand the current security state of the distributed computer system at any specified granularity or resolution. Additionally, MSQ values may be presented and displayed for only certain selected hierarchical levels within a distributed computer system. Because MSQ values are automatically generated, and because the computational overhead for MSQ-value generation is relatively modest and scales proportionately to system size, the currently disclosed methods and systems provide a computationally efficient and highly descriptive indication of both the overall security level of a distributed computer system as well as the security levels and security contexts for individual system entities at each level of the hierarchical organization of system entities within the distributed computer system. The phrase "system entity" may refer to any component of a distributed computer system for which security is monitored, including an entire distributed computer system, individual data centers, discrete computer systems, data-storage appliances, networking appliances, and hardware and computer-instruction-implemented components of discrete computer systems, including data-storage devices, networking devices, operating systems, virtualization layers, distributed applications, distributed-application components, virtual machines, virtual networks, virtual network devices, and virtual data-storage appliances.

Figure 20A:
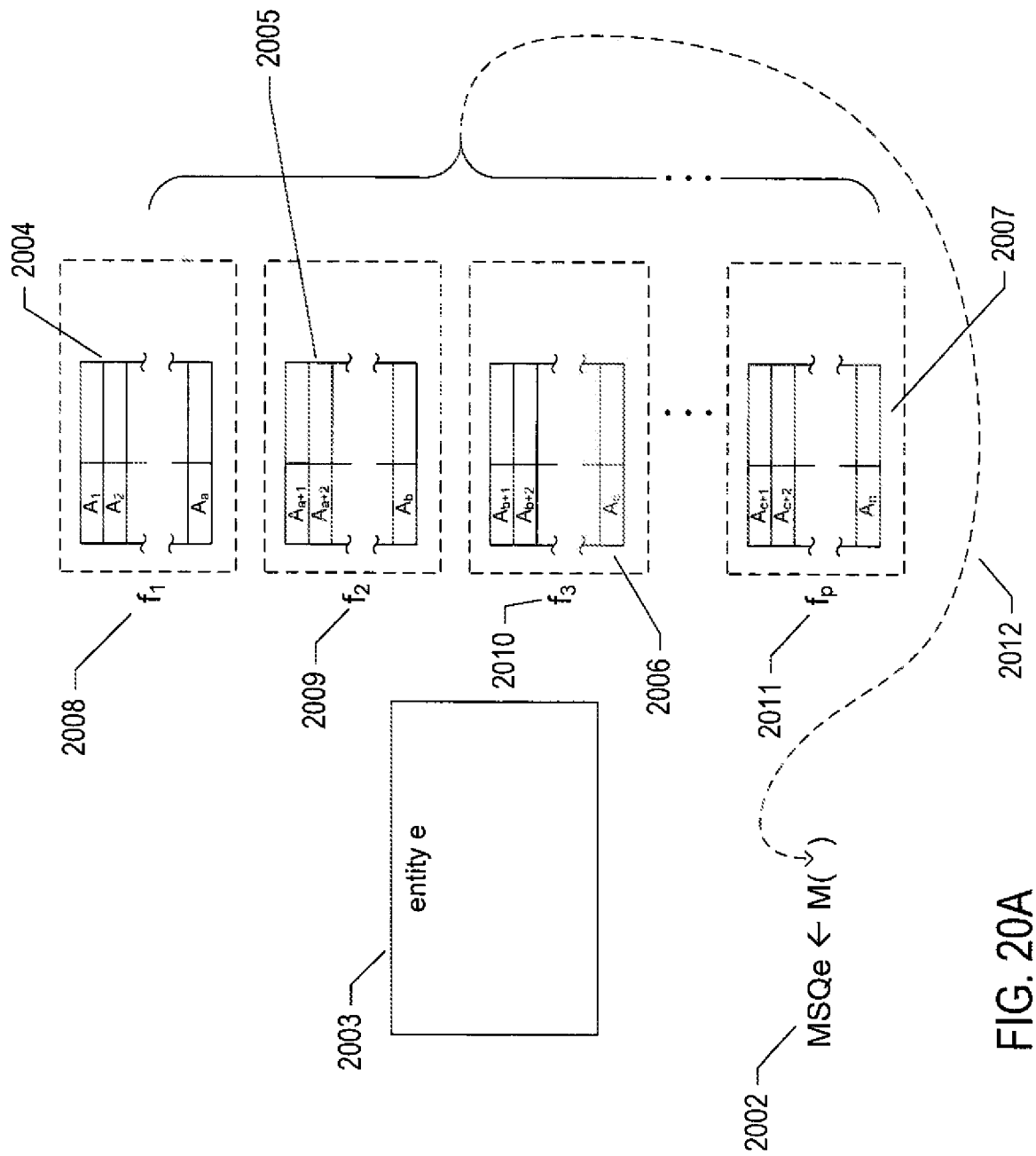
FIGS. 20A-F illustrate generation of a microsegmentation quotient ("MSQ") for a component or computational entity within a distributed computer system.

In FIG. 20A, an MSQ value, $MSQ_e$. 2002 is generated for a particular system entity e 2003 within a distributed computer system. Each system entity within a distributed computer system is associated with a number of attributes. These attributes are Boolean-valued, integer-value, or real-number-valued metrics that are computationally generated from the characteristics and parameters associated with the system entity, particular examples of which are discussed, below. When underlying attribute values are not Boolean or numeric, they can generally be mapped to Boolean or numeric values. Each type of computational entity or component is generally associated with a particular set of attributes. Different types of system entities may have some or many common attributes, in certain cases, or may have nonoverlapping attribute sets, in other cases. The attributes in the set of attributes associated with a computational entity or component can additionally be partitioned into subsets of related attributes. Thus, in the example shown in FIG. 20A, the entire set of attributes A associated with system entity e are partitioned into attributes subsets 2004-2007, and each attributes subset is referred to as a different "feature." In this example, there are four features $f_1$-$f_4$, 2008-2011, respectively. The MSQ value, $MSQ_e$, is computed from the values of the four subsets of attributes, or feature values, as indicated by curved dashed arrow 2012 and the functional notation M( ) in FIG. 20A.

Figure 20B:
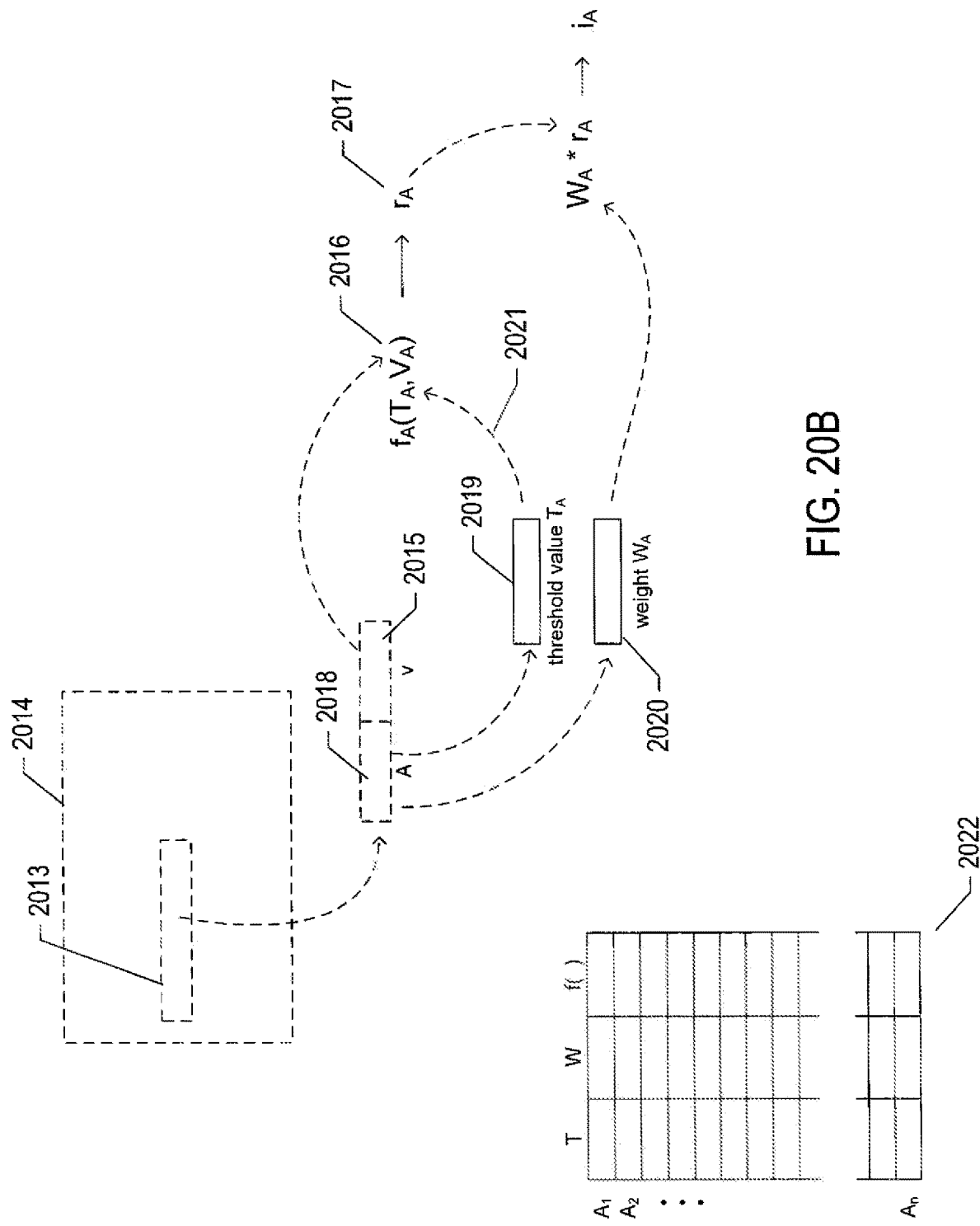

FIG. 20B illustrates a low-level step in the computation of the MSQ value. $MSQ_e$. For each attribute of each feature, such as the example attribute 2013 of example feature 2014, a value 2015 associated with the attribute is input to a function $f_A$ associated with the attribute 2016 to generate a result $r_A$ 2017. Each attribute is associated with an attribute type 2018 and an attribute value 2015, and each type of attribute, A, is associated with a threshold value. $T_A$, 2019 and a weight, $W_A$, 2020. The threshold value is also input to the function $f_A$ associated with the attribute to compute the result $r_A$, as indicated by curved arrow 2021, and the result $r_A$ is multiplied by the weight $W_A$ associated with the attribute to generate an increment $i_A$ for the attribute. In the currently described implementation, the increments may have negative or positive values, with negative values indicating insecure states or security levels and positive values indicating secure states or security levels. In alternative implementations, two separate increment counters can be used, one to accumulate insecure increments and the other to accumulate secure increments. In either case, the computed increment $i_A$ for an attribute is a contribution to an overall security state or security level of the entity e by the attribute A. As an example, an integer-valued attribute $A_x$ may indicate the number of ports thorough which a virtual machine is currently communicating with external entities. The threshold associated with the attribute may be an integer, such as 3. The example function associated with the attribute may generates a security-state contribution of −10 when the attribute value is greater than twice the threshold value, a security-state contribution of −3 when the attribute value is greater than or equal to the threshold value, and a security-state contribution of 5 when the attribute value is less than the threshold value. The weight associated with attribute $A_x$ reflects the relative importance of this attribute to the overall security state of entity e. As indicated by table 2022 in FIG. 20B, the thresholds, weights, and functions associated with each of the attributes associated with the entity type of entity e together represent parameters for the MSQ-value-generation process for entities of the type to which entity e belongs.

Figure 20C:
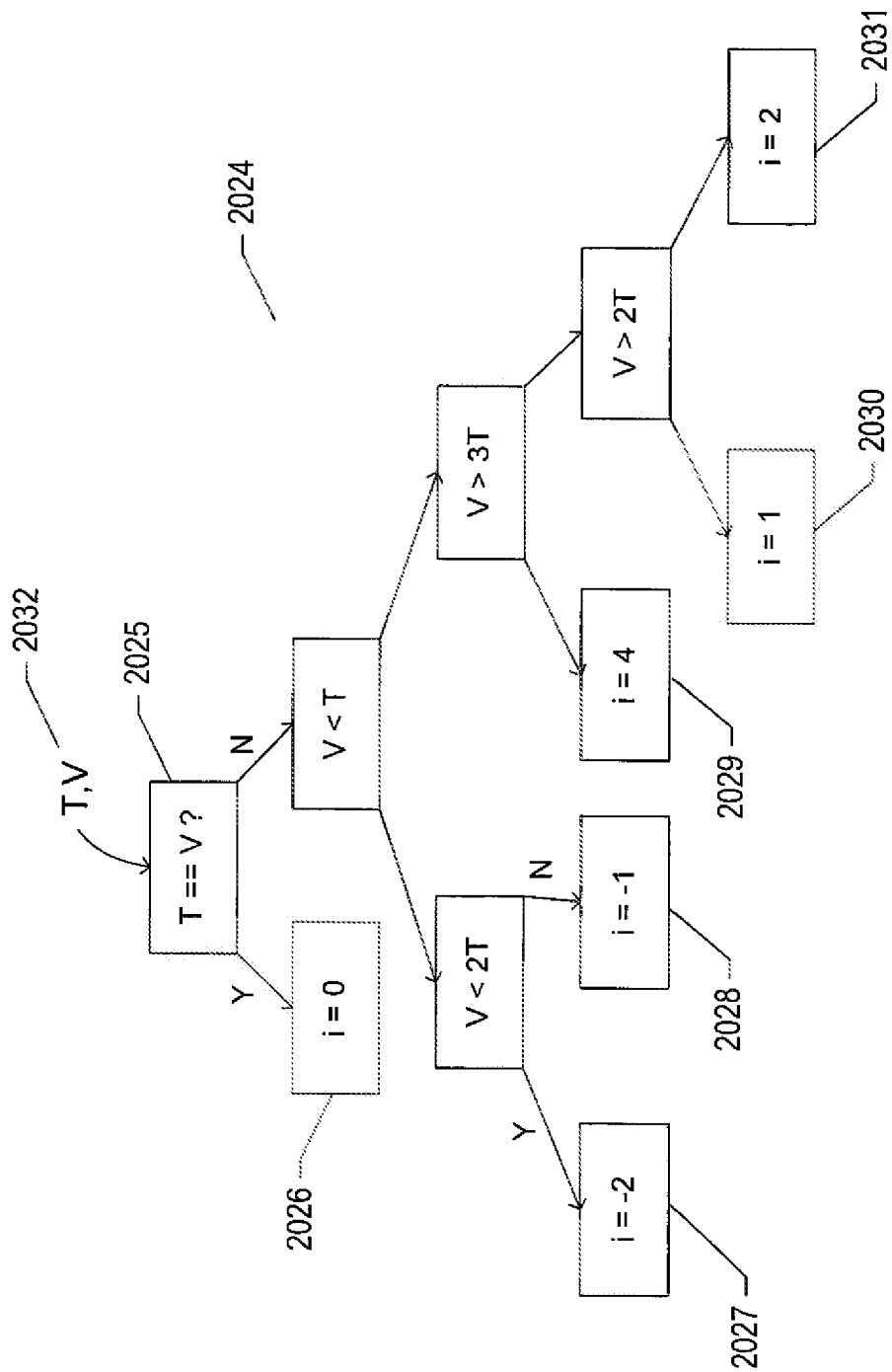

FIG. 20C illustrates one approach to encoding a function, associated with an attribute a, that generates an attribute increment $i_a$. This approach is referred to as a "decision tree." The decision tree 2024 is an acyclic graph with a single root node 2025 and multiple leaf nodes 2026-2031. A threshold-value and attribute-value pair 2032 is input to a decision-tree traversal process to identify a particular leaf node associated with the threshold-value and attribute-value pair. The leaf node indicates the value returned by the function implemented by the decision tree while intermediate nodes provide tests, based on the input threshold value and attribute value, to indicate to which child node of the intermediate node to transition during the traversal. Decision trees are straightforwardly generated from training-set data by various decision-tree-generation processes. In addition, decision trees can be parametrically specified. There are, of course, many alternative ways to implement functions associated with attributes, including simple closed-form algebraic implementations, tabular implementations, or computational-routine implementations.

Figure 20D:
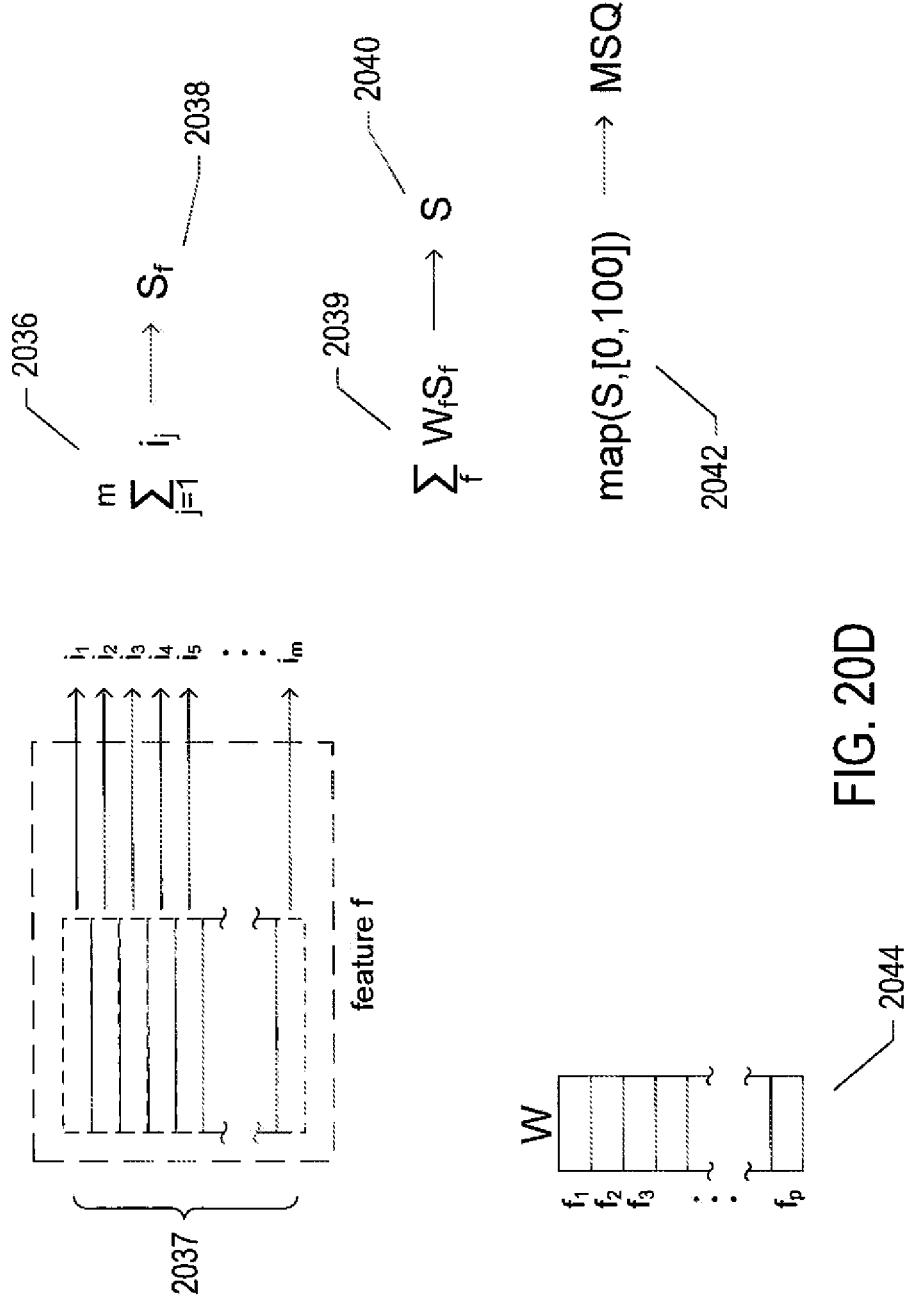
Figure 20E:
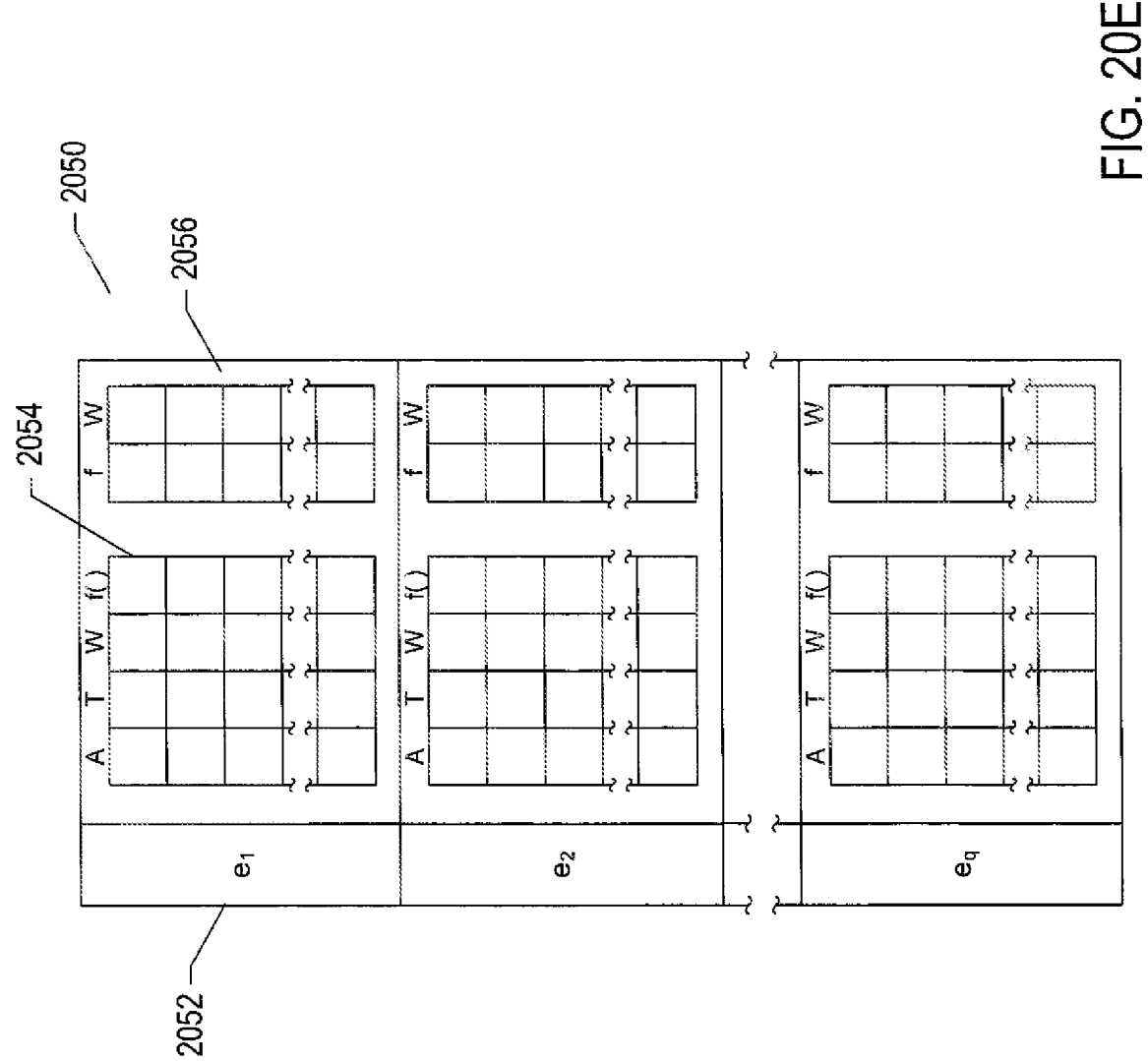
Figure 20F:
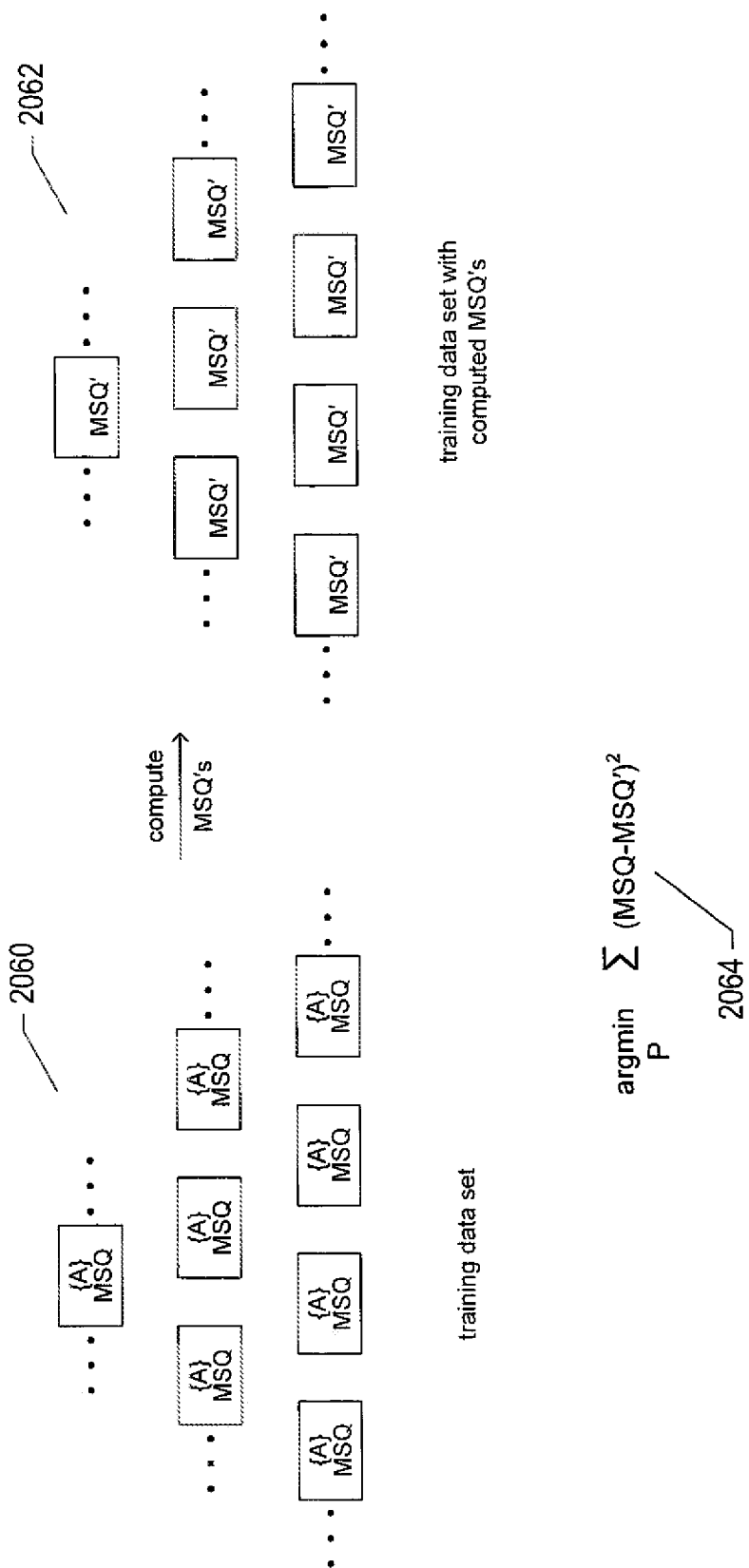

FIG. 20D illustrates remaining steps in the computation of the MSQ value, $MSQ_e$, for computational entity e in the example of FIGS. 20D-F. The sum of the attribute increments 2036 generated for all of the attributes associated with a feature 2037 produces a feature value $S_f$ 2038 for the feature f. The sum of the feature values $S_f$ multiplied by corresponding feature weights Wf 2039 produces a numeric result S 2040. Finally, the numeric result S is mapped 2042 to the range associated with MSQ values to generate $MSQ_e$. As shown by table 2044 in FIG. 20D, the weights associated with each feature represent additional parameters for MSQ generation.

In FIG. 20E, the set of parameters for the MSQ-generation process is represented by table 2050, which includes an entry for each different type of system entity, such as entry 2052 corresponding to system-entity type $e_1$, for which MSQ values are generated by the currently disclosed methods and systems. Each type of system entity is associated with the threshold, weight, and function parameters for each attribute associated with the system-entity type, represented by table 2054 for system-entity type $e_1$, and the weights for each feature, represented by table 2056 for system entity-type $e_1$.

As illustrated in FIG. 20F, the parameter values for the MSQ-generation process are obtained by a multi-variable regression, or other parameter-determination processes, using a training data set. The training data set 2060 includes a set of attribute values and MSQ values for each of a large number of system entities in one or more distributed computer systems. When possible, the training data set is obtained from one or more distributed computer systems similar to the distributed computer system for which MSQ values are to be generated by the currently disclosed methods. The training-data-set MSQ values may be obtained by expert analysis or a combination of expert analysis and automated analysis of comprehensive data collected during operation of the one or more distributed computer systems. The method for MSQ generation discussed above with reference to FIGS. 20A-E is employed, with initial default or estimated parameter values, to recompute the MSQ values for the training-data-set system entities 2062. This process can be iteratively regressed, to iteratively refine the parameters by minimizing the squared differences between the MSQ values assigned to the system entities in the training data set and the MSQ values computed by the MSQ-generation process, as indicated by expression 2064.

Figure 21A:
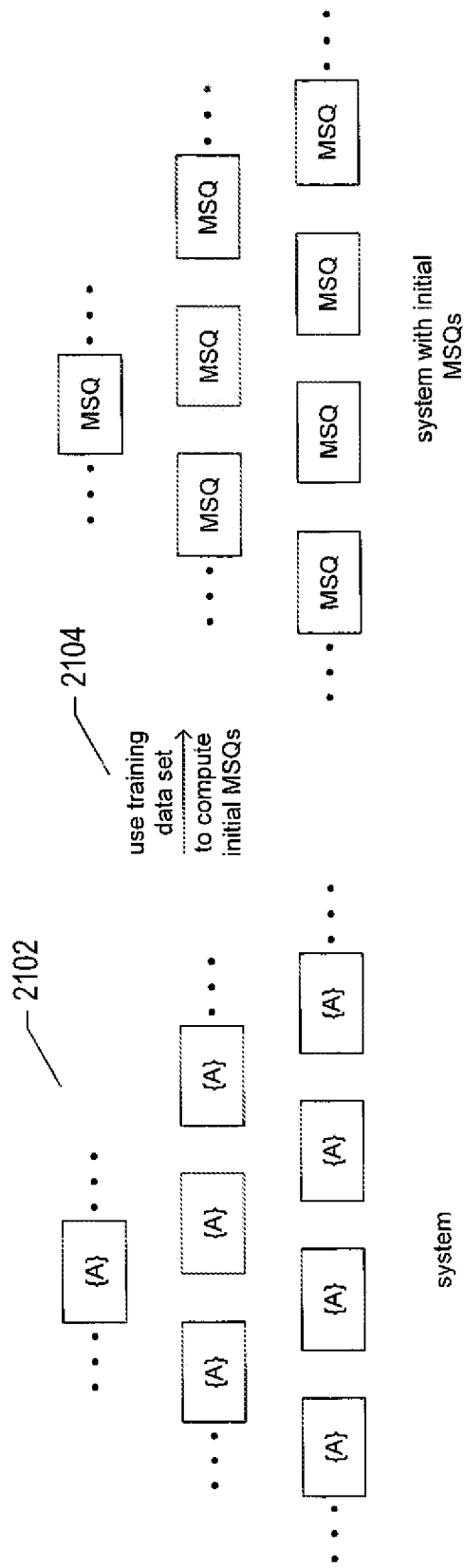
FIGS. 21A-C illustrate one method by which initial MSQ values are generated for the components and computational entities of a distributed computer system.
Figure 21B:
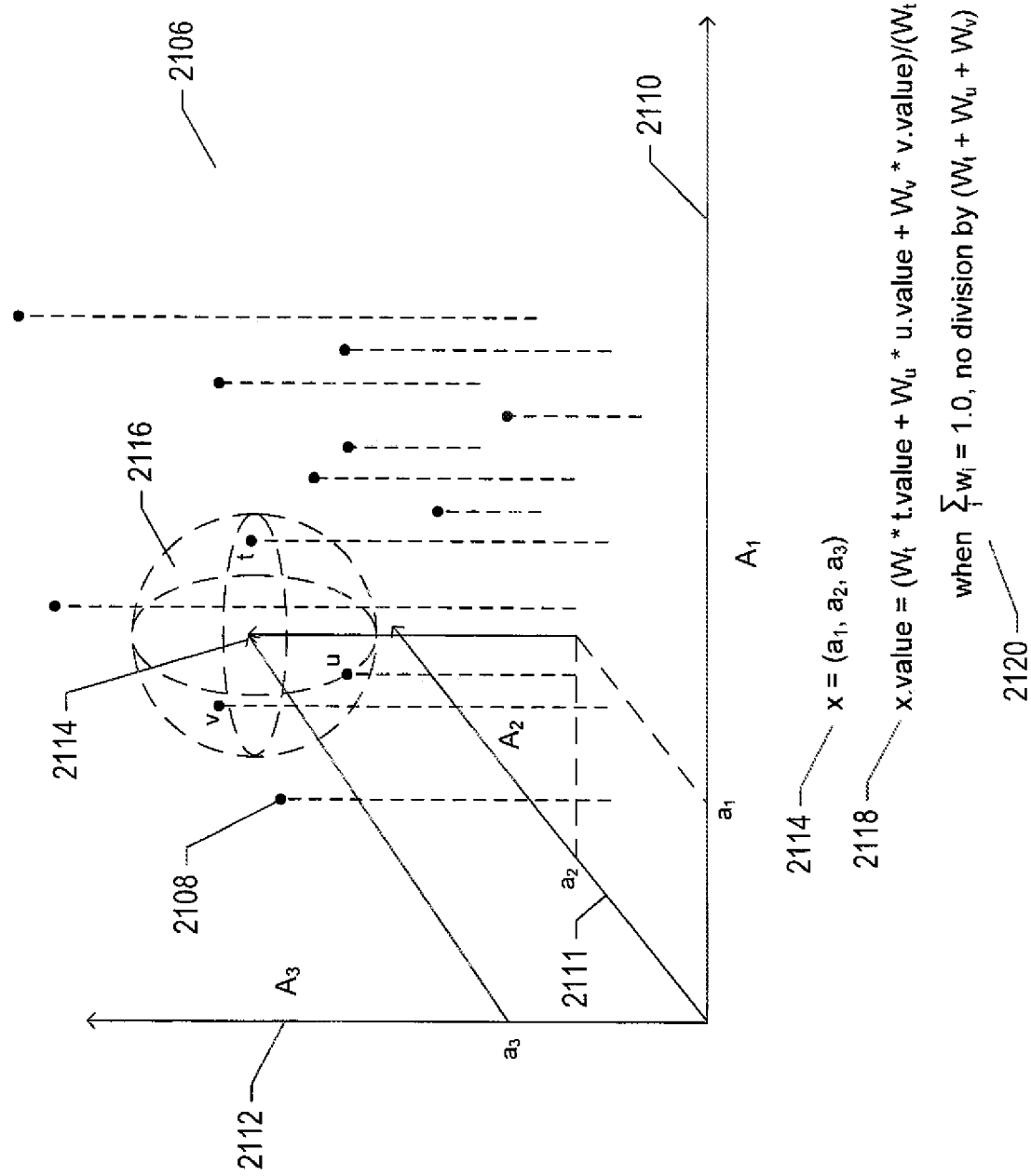
Figure 21C:
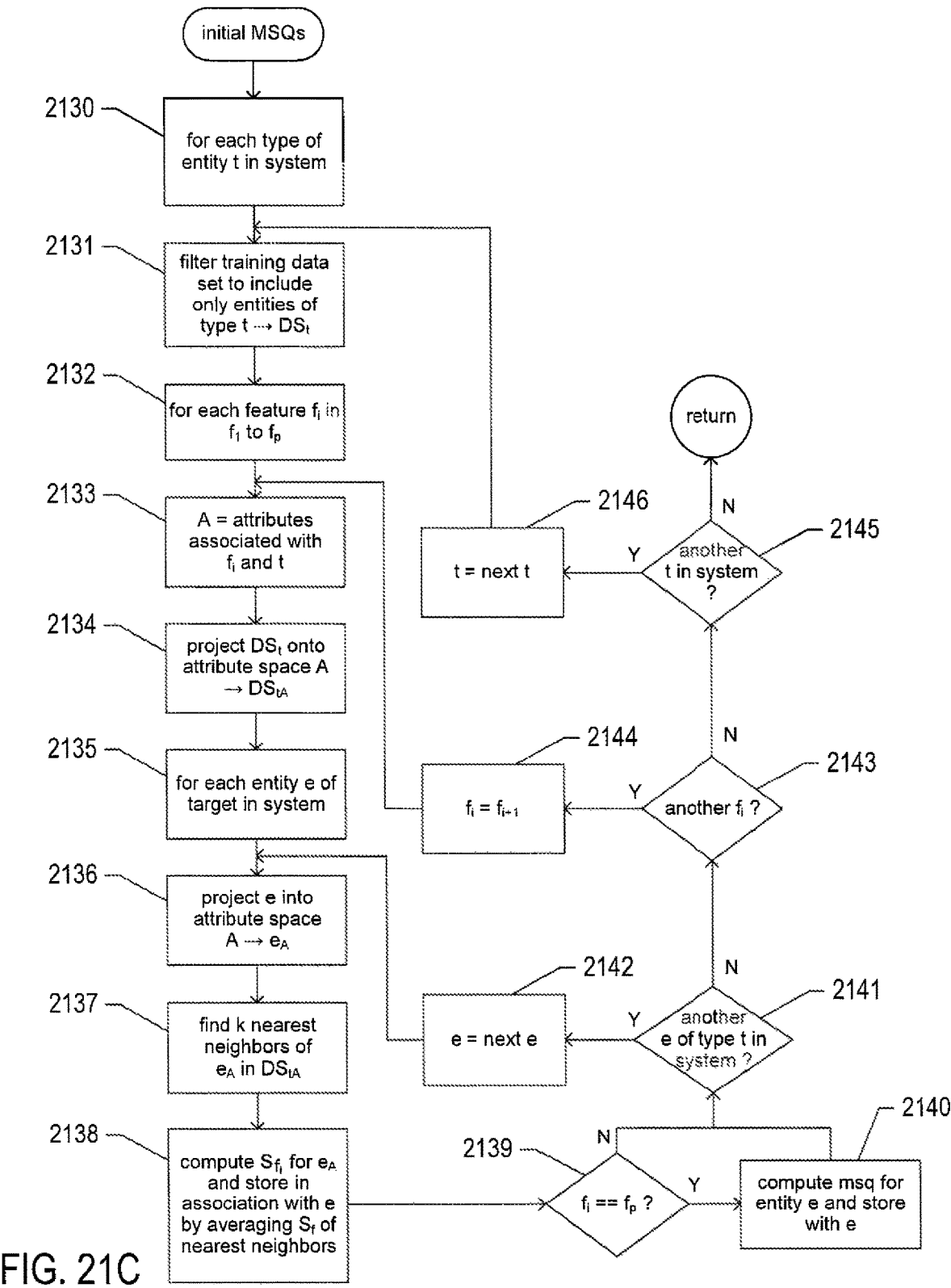

FIGS. 21A-C illustrate one method by which initial MSQ values are generated for the system entities of a distributed computer system. As shown in FIG. 21A, the system entities of a distributed computer system 2102, each represented by a rectangle, are associated with attribute values. The currently disclosed MSQ-value-generation process employs an iterative method to compute current MSQ values, since the MSQ value of a given system entity often depends on the MSQ values of other system entities, such as neighboring system entities or parent and/or ancestor system entities in the hierarchical organization of system entities within a distributed computer system. The currently disclosed MSQ-value-generation process needs to establish initial estimates of the MSQ values for the system entities of a distributed computer system and then iteratively refine these estimates in order to generate final, accurate MSQ values. The better the initial estimates, the more quickly the iterative process converges. In one implementation of the currently disclosed methods and systems, the initial MSQ values are computed from the training data set 2104, as indicated in FIG. 21A. As attribute values change, during distributed-computer-system operation, the MSQ values can either be recomputed based on current MSQ values or can be recomputed starting from initial-MSQ-value estimates based on the training data set.

FIG. 21B illustrates the k-nearest-neighbor data-value estimation approach. FIG. 21B shows a three-dimensional plot 2106 of data points in a three-dimensional attribute space. Each data point, such as data point 2108, is located at a position in the three-dimensional attribute space corresponding to the ordered triple of attribute values associated with the point, where each axis 2110-2112 represents a different attribute. Each of the data points is associated with a value. An estimate of the value of a proposed data point x 2114 with coordinates $(a_1, a_2, a_3)$ is estimated, according to the k-nearest-neighbor estimation approach, by computing a weighted average of the values of data points within a neighborhood 2116 about the position of the proposed data point x 2114. The neighborhood is defined by the volume of attribute space around the position of proposed data point x needed to acquire k nearest neighbors, in one approach. As shown by expression 2118, the weighted average of the neighboring data-point values is computed as the sum of the values of the neighboring data points, each multiplied by a weight, divided by the sum of the weights. The division step can be omitted when the sum of the weights is equal to 1.0, as indicated by expression 2120.

FIG. 21C provides a control-flow diagram for one method that estimates initial MSQ values for the system entities of a distributed computer system. This control-flow diagram assumes that a data structure is maintained for the system entities of the distributed computer system where computed values associated with the system entities can be stored. In the for-loop of steps 2130-2146, each different type of system entity t is considered. In step 2131, the training data set is filtered to include only entities of type t, with the filtered results stored in entity-type-filtered training-data set $DS_t$. In the nested for-loop of steps 2132-2144, each different feature associated with entity-type t is considered. In step 2133, the local variable A is set to the attributes associated with the currently considered feature, $f_i$. In step 2134, the filtered training-data set $DS_t$ is projected onto the attribute space A to generate projected-and-filtered training-data set $DS_{tA}$. In the further-nested for-loop of steps 2135-2142, each system entity e of type t in the distributed computer system is considered. In step 2136, system entity e is projected into the attribute space A, generating projected system entity $e_A$. In step 2137, the k nearest neighbors of $e_A$ in $DS_{tA}$ are identified, where k is a parameter. In step 2138, the value $S_f$ for the currently considered feature $f_i$ is estimated, by the k-nearest-neighbor method, from the k nearest neighbors of $e_A$ in projected-and-filtered training-data set $DS_{tA}$. When $f_i$ is the last feature associated with system entity type t, as determined in step 2139, an estimated MSQ for the currently considered system entity is computed from the stored $S_f$ values for the system entity, in step 2140, as discussed above with reference to FIG. 20D.

Figure 22:
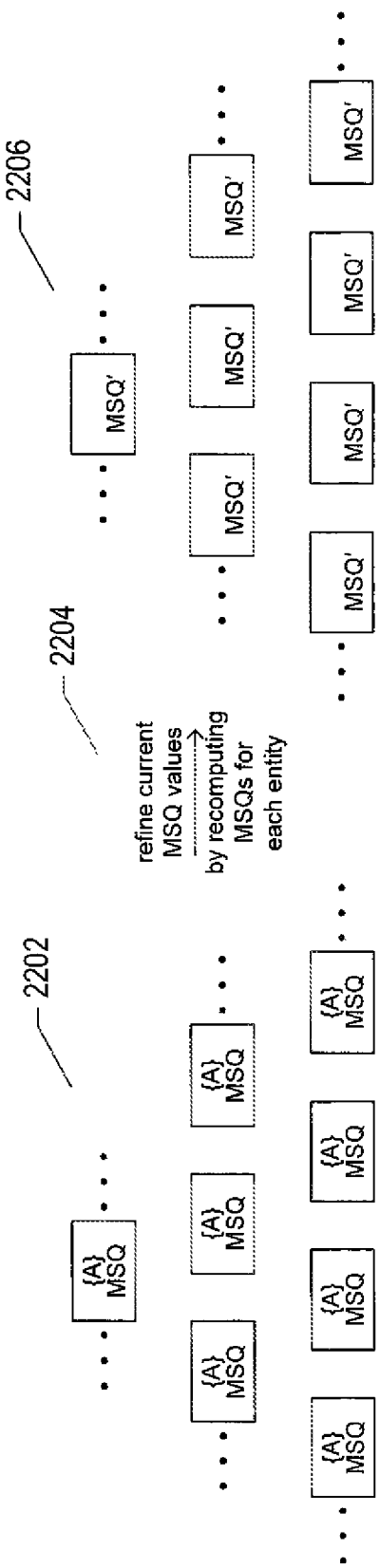
FIG. 22 illustrates process components of the currently disclosed MSQ-generation process following determination of initial MSQ values.

FIG. 22 illustrates process components of the currently disclosed MSQ-generation process following determination of initial MSQ values. Once initial MSQ values have been estimated or otherwise obtained for the system entities of the distributed computer system 2202, the MSQ values are refined by an iterative process 2204 to produce refined MSQ values, denoted MSQ' in FIG. 22, for the system entities 2206.

Figure 23A:
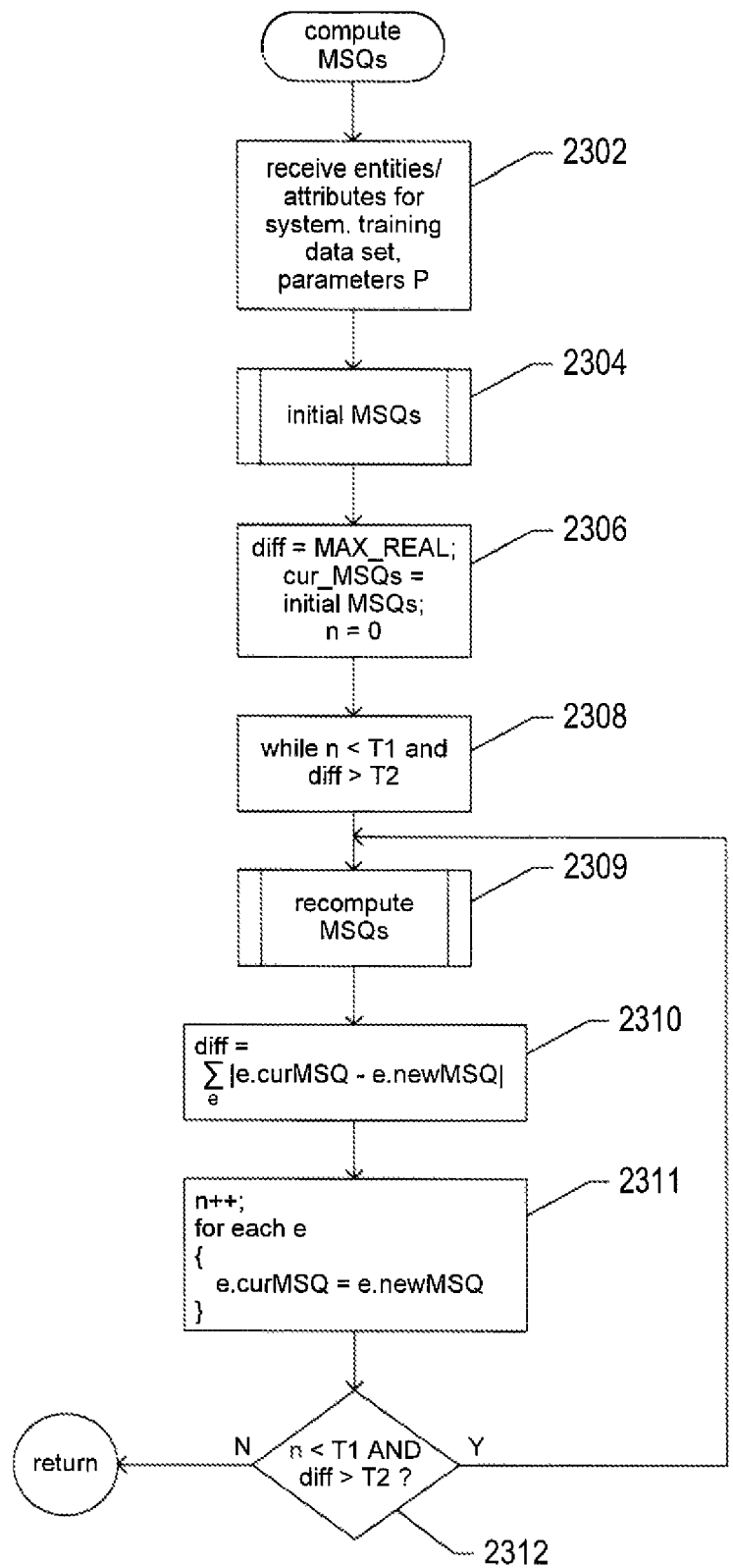
FIGS. 23A-B provides a control-flow diagrams for the iterative refinement of MSQ values.
Figure 23B:
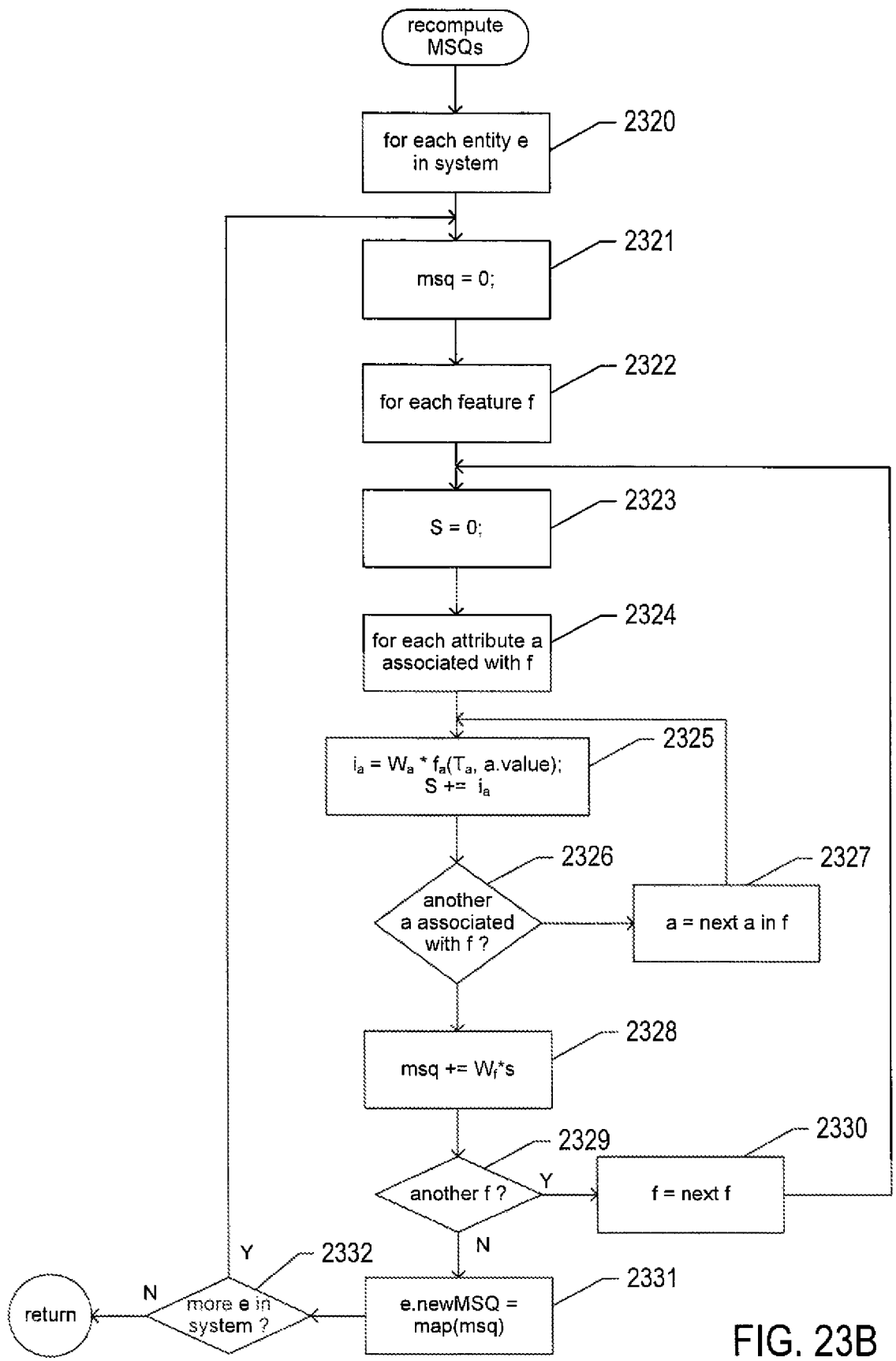

FIGS. 23A-B provide control-flow diagrams for the iterative refinement of MSQ values, discussed above with reference to FIG. 22. FIG. 23A provides a control-flow diagram for a routine "compute MSQs." In step 2302, the routine "compute MSQs" receives values of attributes associated with system-entity types in the distributed computer system for which MSQ values are computed. In certain embodiments, as mentioned above, this information may be contained in a data structure that stores values for all of the different system entities of the distributed computer system. Additionally, the routine "compute MSQs" receives the training data set and the parameters for the computational method, discussed above with reference to FIG. 20E, obtained from the training data set. In step 2304, the initial estimates of the MSQ values for the system entities of the distributed computer are generated from the training data set, as discussed above with reference to FIGS. 21A-C. In step 2306, a local variable diff is set to some large number, a local variable cur_MSQs is initialized to contain or reference the initial MSQ values generated in step 2304, and a local variable n is set to 0. In the while-loop of steps 2308-2312, a routine "recompute MSQs" is repeatedly called until either the number of iterations of the while-loop exceeds a threshold value T1 or the difference between the recomputed MSQ values and current MSQ values falls below a threshold difference T2. In step 2309, the routine "recompute MSQs" is called to compute new, refined MSQ values based on the current MSQ values and attribute values associated with the system entities of the distributed computer system. In step 2310, the difference between the new and current MSQ values is computed as the sum of the absolute value of the differences between each new MSQ and current MSQ value. In step 2311, the local variable n is incremented and the current MSQ values are set to the new MSQ values generated in step 2309.

FIG. 23B provides a control-flow diagram for a routine "recompute MSQs," called in step 2309 of FIG. 23A. In the for-loop of steps 2320-2332, each system entity e of the distributed computer system is considered. In step 2321, the local variable msq is set to 0. In the nested for-loop of steps 2322-2330, each feature f associated with the currently considered system entity e is considered. In step 2323, the local variable s is set to 0. In the further-nested for-loop of steps 2324-2327, each attribute a associated with the currently considered feature f is considered. In step 2325, an increment for the currently considered attribute a is computed, as discussed above with reference to FIG. 20B, and the computed increment is added to the contents of the local variables. Following completion of the further-nested for-loop of steps 2324-2327, a feature value is computed for the currently considered feature f in step 2328, as discussed above with reference to FIG. 20D, and added to the contents of local variable msq. At the completion of the nested for-loop of steps 2322-2330, a new MSQ value is computed for, and stored in association with, the currently considered system entity e.

Figure 24:
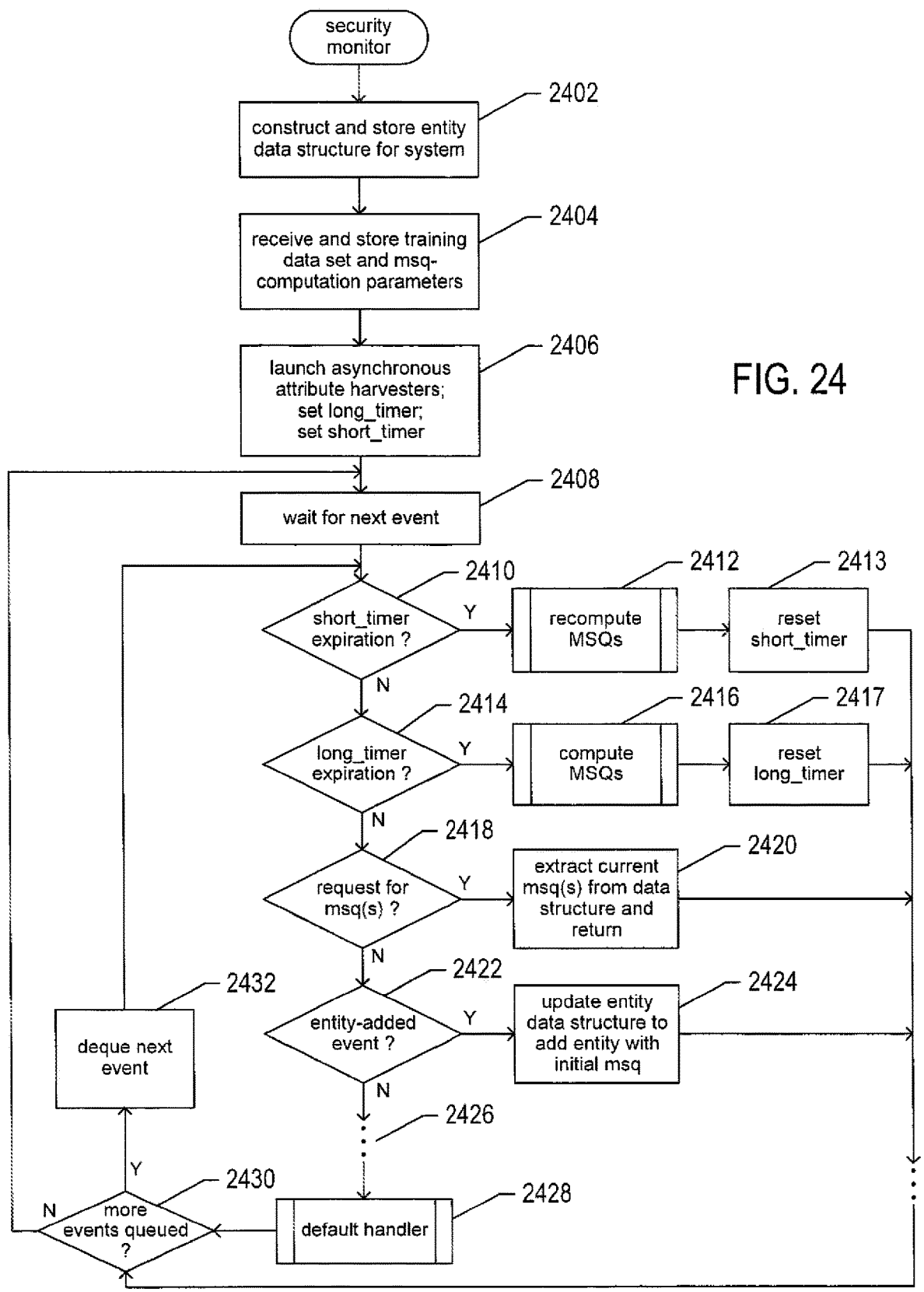
FIG. 24 provides a control-flow diagram for a routine "security monitor," which continuously harvests attribute values from a distributed computer system and intermittently computes and refines MSQ values for the computational entities and components of a distributed computer system.

FIG. 24 provides a control-flow diagram for a routine "security monitor," which continuously harvests attribute values from a distributed computer system and intermittently computes and refines MSQ values for the system entities of a distributed computer system via the MSQ-generation process discussed above with reference to FIGS. 20A-23 B. In step 2402, the routine "security monitor" constructs and initializes an entity data structure for the distributed computer system. In step 2404, the routine "security monitor" receives and stores a training data set and a set of msq-generation parameters, discussed above with reference to FIG. 20E. In step 2406, the routine "security monitor" launches a set of one or more asynchronous attribute harvesters to continuously or intermittently harvest attribute values for the attributes associated with system entities of the distributed computer system. In one implementation, the features associated with system entities include a static-attribute feature and a dynamic-attribute feature. The attributes associated with the static-attribute feature can be monitored intermittently at a relatively low frequency, since they generally do not change, or change very slowly, over the lifetime of a system entity. The attributes associated with the dynamic-attribute feature are monitored at a higher frequency, since they tend to change relatively frequently during the lifetime of a system entity. Other features may be associated with attributes that have additional types of variability, in which case specific attribute harvesters for these features may be launched, in step 2406, with appropriate harvesting frequencies. In addition, two timers, long_timer and short_timer, are initialized in step 2406. The remaining steps, beginning with step 2408, constitute an event handler in which the routine "security monitor" continuously handles various types of events. In step 2408, the routine "security monitor" waits for a next event to occur. When the next-occurring event corresponds to expiration of the timer short_timer, as determined in step 2410, the routine "security monitor" calls the routine "recompute MSQs," discussed above with reference to 23B, to refine the MSQ values associated with the system entities of the distributed computer system based on current values of attributes and the current MSQ values associated with the system entities. Then, in step 2413, the routine "security monitor" resets the timer short_timer. When the next-occurring event corresponds to expiration of the timer long_timer, as determined in step 2414, the routine "compute MSQs." discussed above with reference to FIG. 23A, is called to compute new MSQ values for the system entities, after which, in step 2417, the timer long_timer is reset. When the next-occurring event is reception of a request for one or more MSQ values, as determined in step 2418, the current requested MSQ values are extracted from the data structure and returned to the requester, in step 2420. When the next-occurring event corresponds to addition of a new system entity to the distributed computer system, as determined in step 2422, the data structure is updated to add the new entity or component along with an initial default MSQ value for the entity or component, in step 2424. Ellipsis 2426 indicates that additional types of events may be handled by the routine "security monitor." When there are more events that have been received and queued during handling of the most recently handled event, as determined in step 2430, a next event is dequeued, in step 2432, and control returns to step 2410. Otherwise, control returns to step 2408, where the routine "security monitor" waits for a next event to occur.

Figure 25B:

FIGS. 25A-B illustrates display, by an automated administration-and-management system, of MSQ values generated by the above-discussed MSQ-value-generation process. As shown in FIG. 25A, in a response to a request for display of MSQ values for a particular type of computational entity, the automated administration-and-management system retrieves the MSQ values by requesting them from the security monitor and displays a security state for the computational entities corresponding to the MSQ values 2502. Alternatively, as shown in FIG. 25B, the automated administration-and-management system may display a graphical representation of a portion of the system entities within a distributed computer system 2504 in which different types of shading, different types of image rendering, or different colors can be used to indicate those system entities with security states less secure than a threshold value for the system-entity type. Many additional types of representations of the security states and security contexts of the system entities of a distributed computer system can be rendered and displayed by an automated administration-and-management system, security-monitor subsystem, or other application. In addition, the MSQ values can be used by many types of automated-administration-and-management-system tools and facilities for analysis, problem detection, and problem amelioration.

In the above discussion, attributes are discussed abstractly. An example of the features and attributes employed for workflow computational entities in one implementation of the current disclosed methods and systems is next provided. In this example, the attributes associated with workflows are partitioned into four features: (1) a static-attribute feature; (2) a dynamic-attribute feature; (3) a neighborhood-attribute feature; and (4) an environment-attribute feature. The static-attribute feature is associated with attributes that indicate: (1) an association of the workload with white-list and black-list ACL-like filters; (2) a specified maximum number of ports which the workload can listen; (3) whether or not rules associated with the workload specify particular ports; (4) the number and applicability of rules associated with the workload; (5) the existence of stateless or non-TCP strict rules; (6) the presence of rules specifying a maximum number of IP addresses associated with the workload; (7) the permissiveness of rules associated with the workload: (8) whether or not packet logging is provided to the workload; (9) the presence of a flow-limiting configuration: (10) whether or not intrusion-detection services are provided to the workload; (11) whether IP-reputation and/or URL-category services are provided to the workload; (12) the presence of various types of level-7 rules, including rules directed to secure-socket-layer version; and (13) the presence of rules related to policy coverage for the workload. There are many either examples of static-attribute-feature-associated attributes. The dynamic-attribute feature is associated with attributes that indicate: (1) whether the workload is listening to more ports that a specified maximum number of ports; (2) the number of source addresses connecting to the workload: (3) number of external computational entities with which the workload is currently communicating: (4) whether or not the workload is initiating communications with external computational entities; (5) whether the workload is currently running insecure services; (6) the number and identities of current users of services provided by the workload: (7) the number and types of error codes generated by the workload; and (8) characteristics of the protocols and session histories for current workload communications. There are many other examples of dynamic-feature attributes. The neighborhood-attribute feature is associated with attributes that indicate: (1) the MSQ values currently associated with neighboring workloads; (2) the number and types of neighboring workloads; (3) indications of the nature of the communications history of the workload with neighboring workloads; and (4) errors specific to interactions with neighboring workloads. There are many other examples of attributes associated with the neighborhood-attribute feature. The environment-attribute feature includes attributes that indicate: (1) the presence of a DMZ; (2) presence of higher-level intrusion-detection services and other security features; (3) accessibility of local communications to higher-level communications: and (4) the presence of secure data-storage facilities. There are many other examples of attributes associated with the environment-attribute feature.

The present invention has been described in terms of particular embodiments, it is not intended that the invention be limited to these embodiments. Modifications within the spirit of the invention will be apparent to those skilled in the art. For example, any of many different implementations of the above-disclosed microsegmentation-quotient methods and subsystems can be obtained by varying various design and implementation parameters, including modular organization, control structures, data structures, hardware, operating system, and virtualization layers, and other such design and implementation parameters. As mentioned above, there are many different possible methods for, and parameters associated with, MSQ-value generation. The currently disclosed implementation uses a simple linear computational methods for computing attribute increments, feature values, and MSQ values, but many more complex computational methods can be used, including non-linear methods. There are a large variety of possible different types of features and attributes associated with features, and a large number of different possible ways of computing values for the many different types of attributes. A variety of different types of regression methods can be used for computing initial estimates of MSQ values in many different types of often isolation methods can be used for refining MSQ values.

The invention claimed is:

1. A security-monitoring system that generates microsegmentation quotients, which represent security levels of system entities within a distributed computer system, that are displayed to administration and management personnel to facilitate evaluation, by the administration and management personnel, of security contexts of particular components or subsystems within the distributed computer system and amelioration of security problems, the security-monitoring system comprising:
   one or more processors, one or more memories, and one or more data-storage devices within one or more computer systems; and
   computer instructions, stored in one or more f the one or memories, that, when executed by one or more of the processors, control the security system to
      estimate a microsegmentation quotient for each of the system entities,
      iteratively refine the microsegmentation quotient for each of the system entities,
      periodically recompute the microsegmentation quotient for each of the system entities,
      receive, from one or more requestors, requests for microsegmentation quotients for each of one or more specified system entities, the requestors including
         an automated administration-and-management system, and
         a display routine that displays microsegmentation quotients on a display device, and
      transmit the requested microsegmentation quotients to the requestors.

2. The security-monitoring system of claim 1 wherein the system entities include one or more:
   distributed computer systems;
   individual data centers;
   discrete computer systems;
   data-storage appliances;
   networking appliances; and
   hardware and computer-instruction-implemented components of discrete computer systems, including
      data-storage device,
      networking devices,
      operating systems,
      virtualization layers,
      distributed applications,
      distributed-application components,
      virtual machines,
      virtual networks,
      virtual network appliances, and
      virtual data-storage appliances.

3. The security-monitoring system of claim 1 wherein a microsegmentation quotient is a scalar value within a specified range of scalar values.

4. The security-monitoring system of claim 1 wherein each type of system entity is associated with a set of features that each comprises a set of attributes, each attribute a Boolean-valued, integer-value, or real-number-valued metric, the value of which is computationally generated, for a particular system entity of the type of system entity at a particular time, from characteristics and parameters associated with the system entity.

5. The security-monitoring system of claim 4
   wherein each attribute of each system-entity type is associated with an attribute threshold, an attribute weight, and an attribute function; and
   wherein an attribute increment is generated for a system entity by inputting the value of the attribute, along with the attribute threshold associated with the attribute for the system-entity type of the system entity, to the attribute function associated with the attribute for the system-entity type of the system entity, which returns an attribute result that is multiplied by the attribute weight associated with the attribute for the system-entity type of the system entity to produce an attribute increment.

6. The security-monitoring system of claim 5 wherein a microsegmentation quotient for a system entity if generated by
   for each feature associated with the system-entity type of the system-entity,
      summing the attribute increments of the attributes associated with the feature for the system entity to produce a feature value;
   generating a feature term for each feature associated with the system-entity type of the system-entity by multiplying the feature value for the feature with a feature weight associated with feature; and
   adding the feature terms to produce an initial quotient.

7. The security-monitoring system of claim 6 further comprising mapping the initial quotient to the specified range of scalar values to generate a final microsegmentation quotient.

8. The security-monitoring system of claim 1 wherein the security-monitoring system estimates a microsegmentation quotient for each of the system entities by:
   using a training data set to estimate the microsegmentation quotient for each system entity, the training data set including attribute values and microsegmentation-quotient values for each system entity in a set of system entities in one or more distributed computer systems.

9. The security-monitoring system of claim 8 wherein the security-monitoring system estimates the microsegmentation quotients for each system entity of a system-entity type by filtering the training data set to include only data for
system entities of the system-entity type;
for each feature associated with the system-entity type,
for each attribute associated with the feature,
projecting the attribute values for the feature in the training data set as data points into an attribute space,
for each system entity of a system-entity type,
projecting the attribute values of the system entity for the feature as a target point into the attribute space,
identifying a specific number of nearest data-point neighbors of the target point, and
determining an initial feature value of the feature for the system entity from the specific number of nearest data-point neighbors of the target point; and
generating an initial microsegmentation quotient for each system entity of the system-entity type from the feature values determined for the system entity.

10. The security-monitoring system of claim 1 wherein the security-monitoring system iteratively refines the microsegmentation quotient for each system entity by
recomputing the microsegmentation quotient for each system entity based on current microsegmentation quotients for each system entity until a maximum number of recomputations of the microsegmentation quotients have been carried out or until the sum of the absolute values of the squared differences between the most recently recomputed microsegmentation quotients and the next most recently recomputed microsegmentation quotients falls below a threshold sum.

11. The security-monitoring system of claim 1 wherein the security-monitoring system periodically recomputes the microsegmentation quotient for each of the system entities by:
initially and at time intervals of a first length,
estimating a microsegmentation quotient for each of the system entities,
for each system entity,
assigning the estimated microsegmentation quotient for the system entity to the system entity as the current microsegmentation quotient, and
iteratively refining the microsegmentation quotient for each of the system entities; and
at time intervals of a second length, shorter than the first length, within the time intervals of the first length,
iteratively refining the microsegmentation quotient for each of the system entities.

12. A method that generates a microsegmentation quotient for a system entity which represent a security level of the system entity within a distributed computer system, the method carried out by a security-monitoring system that generates microsegmentation quotients, which represent security levels of system entities within a distributed computer system, that are displayed to administration and management personnel to facilitate evaluation, by the administration and management personnel, of security contexts of particular components or subsystems within the distributed computer system and amelioration of security problems, the security-monitoring system implemented within one or more processors, one or more memories, and one or more data-storage devices within one or more computer system having one or more processors, one or more memories, and one or more data-storage devices, the method comprising:
associating each type of system entity with a set of features that each comprises a set of attributes, each attribute a Boolean-valued, integer-value, or real-number-valued metric, the value of which is computationally generated, for a particular system entity of the type of system entity at a particular time, from characteristics and parameters associated with the system entity;
associating each attribute of each system-entity type with an attribute threshold, an attribute weight, and an attribute function;
associating each feature of each system-entity type with a feature threshold; and
generating a microsegmentation quotient for the system entity from the current attribute values for the attributes associated with the system-entity type of the system entity using the attribute thresholds, attribute weights, and attribute functions for the attributes associated with the system-entity type of the system entity and the feature thresholds for the features associated with the system-entity type of the system entity.

13. The method of claim 12 wherein generating a microsegmentation quotient for the system entity further comprises:
for each feature associated with the system-entity type of the system-entity,
summing attribute increments of the attributes associated with the feature for the system entity to produce a feature value;
generating a feature term for each feature associated with the system-entity type of the system-entity by multiplying the feature value for the feature with a feature weight associated with feature; and
adding the feature terms to produce an initial quotient.

14. The security-monitoring system of claim 13 further comprising mapping the initial quotient to the specified range of scalar values to generate a final microsegmentation quotient.

15. The method of claim 13 wherein an attribute increment is generated for a system entity by inputting the value of the attribute, along with the attribute threshold associated with the attribute for the system-entity type of the system entity, to the attribute function associated with the attribute for the system-entity type of the system entity, which returns an attribute result that is multiplied by the attribute weight associated with the attribute for the system-entity type of the system entity to produce the attribute increment.

16. The method of claim 12 further comprising estimating a microsegmentation quotient for a system entity by:
using a training data set to estimate the microsegmentation quotient for the system entity, the training data set including attribute values and microsegmentation-quotient values for each system entity in a set of system entities in one or more distributed computer systems.

17. The method of claim 16 wherein using a training data set to estimate the microsegmentation quotient for the system entity further comprises:
filtering the training data set to include only data for system entities of the system-entity type;
for each feature associated with the system-entity type,
for each attribute associated with the feature,
projecting the attribute values for the feature in the training data set as data points into an attribute space,
projecting the attribute values of the system entity for the feature as a target point into the attribute space,
identifying a specific number of nearest data-point neighbors of the target point, and determining an initial feature value of the feature for the system entity from the specific number of nearest data-point neighbors of the target point; and generating an initial microsegmentation quotient for the system entity from the feature values determined for the system entity.

18. The method of claim 17 wherein a microsegmentation quotient is a scalar value within a specified range of scalar values.

19. The method of claim 12 further comprising iteratively refines the microsegmentation quotient for each system entity by:

recomputing the microsegmentation quotient for each system entity based on current microsegmentation quotients for each system entity until a maximum number of recomputations of the microsegmentation quotients have been carried out or until the sum of the absolute values of the squared differences between the most recently recomputed microsegmentation quotients and the next most recently recomputed microsegmentation quotients falls below a threshold sum.

20. A data-storage device encoded with computer instructions that, when executed by a security-monitoring system implemented within a one or more processors, one or more memories, and one or more data-storage devices within one or more computer system having one or more processors, one or more memories, and one or more data-storage devices, control the security-monitoring system to:

estimate a microsegmentation quotient for each of the system entities within a distributed computer system, iteratively refine the microsegmentation quotient for each of the system entities, periodically recompute the microsegmentation quotient for each of the system entities, receive, from one or more requestors, requests for microsegmentation quotients for each of one or more specified system entities, the requestors including an automated administration-and-management-system, and a display routine that displays microsegmentation quotients on a display device, and transmit the requested microsegmentation quotients to the requestors.

* * * * *